(12) United States Patent
Martin

(10) Patent No.: US 10,561,054 B2
(45) Date of Patent: Feb. 18, 2020

(54) WIRELESS CONTROL SYSTEM FOR FLOATING ROW CLEANER

(71) Applicant: Ronald S. Martin, Elkton, KY (US)

(72) Inventor: Ronald S. Martin, Elkton, KY (US)

( * ) Notice: Subject to any disclaimer, the term of this patent is extended or adjusted under 35 U.S.C. 154(b) by 91 days.

(21) Appl. No.: 15/690,269

(22) Filed: Aug. 29, 2017

(65) Prior Publication Data

US 2018/0054953 A1 Mar. 1, 2018

Related U.S. Application Data

(60) Provisional application No. 62/380,936, filed on Aug. 29, 2016.

(51) Int. Cl.

| A01B 63/24 | (2006.01) |
|---|---|
| A01B 63/32 | (2006.01) |
| G05D 1/00 | (2006.01) |
| A01C 5/06 | (2006.01) |
| A01C 7/00 | (2006.01) |
| A01B 27/00 | (2006.01) |
| A01C 7/20 | (2006.01) |
| A01B 15/18 | (2006.01) |
| A01B 5/04 | (2006.01) |

(52) U.S. Cl.
CPC .......... *A01B 63/32* (2013.01); *A01B 27/005* (2013.01); *A01C 5/064* (2013.01); *A01C 7/006* (2013.01); *A01C 7/205* (2013.01); *G05D 1/0011* (2013.01); *A01B 5/04* (2013.01); *A01B 15/18* (2013.01); *A01C 5/068* (2013.01); *Y02P 60/23* (2015.11)

(58) Field of Classification Search
USPC ................. 700/245–264; 701/2, 50
See application file for complete search history.

(56) References Cited

U.S. PATENT DOCUMENTS

| 4,413,685 | A | * | 11/1983 | Gremelspacher | ...... | A01B 63/22 111/14 |
|---|---|---|---|---|---|---|
| 7,673,570 | B1 | * | 3/2010 | Bassett | ................ | A01B 61/046 111/140 |
| 8,428,831 | B2 | * | 4/2013 | Thompson | ............ | A01B 69/004 172/280 |
| 8,550,020 | B2 | * | 10/2013 | Sauder | .................. | F15B 11/042 111/200 |
| 9,888,624 | B2 | * | 2/2018 | Maniar | .................. | A01C 7/088 |
| 2012/0060730 | A1 | * | 3/2012 | Bassett | .................. | A01C 7/205 111/149 |
| 2012/0060731 | A1 | * | 3/2012 | Bassett | .................. | A01C 7/205 111/149 |
| 2012/0305274 | A1 | * | 12/2012 | Bassett | .................. | A01C 7/205 172/5 |
| 2012/0312568 | A1 | * | 12/2012 | Van Buskirk | ........ | A01B 29/048 172/140 |

(Continued)

*Primary Examiner* — Jonathan L Sample

(74) *Attorney, Agent, or Firm* — Duncan Galloway Egan Greenwald, PLLC; Kevin T. Duncan

(57) ABSTRACT

A wireless control system may include a controller and portable computing device. The controller may be configured to communicate with the portable computing device so that an operator may set a specific value and/or parameters in which the hydraulic cylinder may operate. In an aspect, the hydraulic cylinder may be engaged with a row cleaner assembly, and in another aspect it may be engaged with a closing wheel, and in yet another aspect it may be engaged with a furrow forming assembly.

10 Claims, 20 Drawing Sheets

(56) References Cited

U.S. PATENT DOCUMENTS

| | | | | |
|---|---|---|---|---|
| 2013/0146318 A1* | 6/2013 | Bassett | ............... | A01B 61/044 172/5 |
| 2013/0248212 A1* | 9/2013 | Bassett | ............... | A01B 71/02 172/4 |
| 2014/0048297 A1* | 2/2014 | Bassett | ............... | A01B 63/114 172/4 |
| 2014/0116735 A1* | 5/2014 | Bassett | ............... | A01B 61/044 172/2 |

* cited by examiner

WIRELESS CONTROL SYSTEM FOR FLOATING ROW CLEANER

CROSS-REFERENCE TO RELATED PATENT APPLICATIONS

This patent application claims priority to U.S. Provisional Patent Application No. 62/380,936, filed Aug. 29, 2017, entitled "WIRELESS CONTROL SYSTEM," which application is hereby incorporated by reference herein in the entirety.

FIELD OF INVENTION

The methods described herein are generally applicable to the field of agricultural equipment. The embodiments shown and described herein are more particularly for improved row cleaning for delivery of seed or fertilizer. Although in no way limiting, the present disclosure is particularly suited for minimum or no-till conditions.

BACKGROUND OF THE INVENTION

U.S. Pat. No. 4,785,890 issued to Martin for "Ground-driven rotary row cleaner" illustrates prior art that may be relevant to the invention disclosed and claimed herein, but which fails to teach the improvement disclosed and claimed herein.

SUMMARY OF THE INVENTION

Applicant discloses and claims herein a row cleaner frame and structure, without limitations, which has particular application as an improved no-till or minimum tillage planting apparatus and or planting row unit. The present invention provides a mounting mechanism for planter row unit row cleaners. It includes an assembly for mounting the residue wheels in front of the row unit so that the row cleaner wheels are mounted in front of and to each side of a coulter, as in FIGS. 7-11. The row cleaner assembly itself is pivotally connected to the planter frame and one side of the support arm upon which the row unit coulter is mounted. The mounting of the row cleaner allows it to rise and fall about a horizontal axis, within a predetermined range, in response to either terrain elevation changes or contact with non-moveable obstructions such as rocks, large soil clods and root crowns.

A large of number of corn acres are planted with a row spacing of 30-38 inches. For various reasons, including increased yields, decreasing erosion and decreasing chemical costs, farmers are interested in reducing row spacing to less than 30 inches. Reductions to a row spacing of 15-20 inches is therefore desirable. The reduction in width between planted rows in combination with the use of row cleaners can lead to plugging of the planter row units i.e. the volume of trash flow is too high for the amount of actual physical space available between planter row units contiguously mounted on a tool bar. Furthermore, the reduced spacing between row units reduces the physical space available for mounting a row cleaner to a row unit. This problem is especially an issue for planters having a split row type, such as the 1700 Series John Deere front-fold planter. Applicant's design is of benefit and desirable. Additionally, many users wish to mount an accessory tool with the row cleaner, i.e. a coulter mounted in combination with a row cleaner for each row unit.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION

Figure 1:
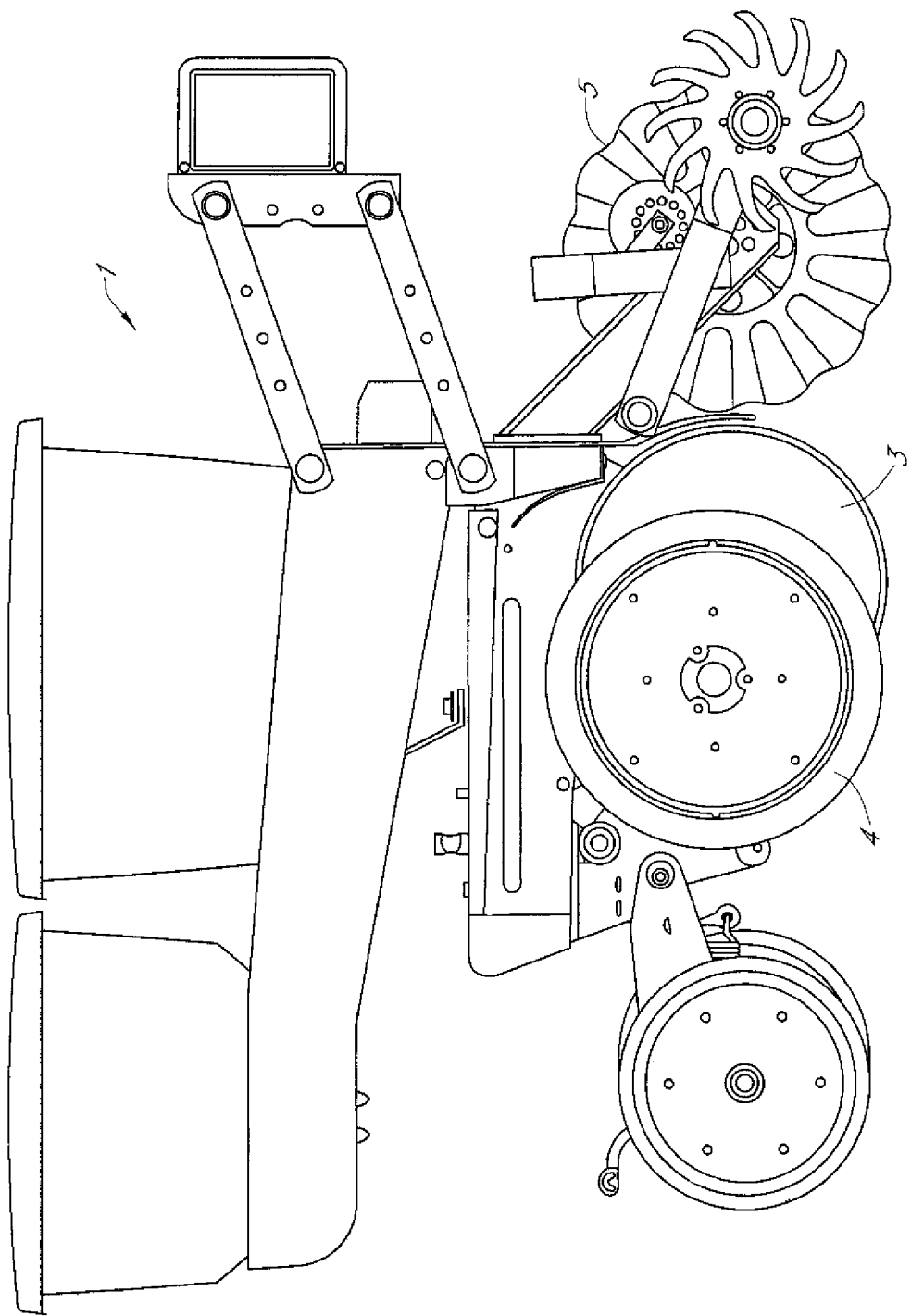
FIG. 1 illustrates a planter row unit mountable upon a tool bar as found in the prior art.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

LISTING OF ELEMENTS

| Element Description | Element Number |
|---|---|
| Planter row unit | 1 |
| Front plate | 2 |
| Row unit disc opener | 3 |
| Planter depth tire | 4 |
| Coulter | 5 |
| Tool arm | 6 |
| Tool arm first end | 6a |
| Tool arm second end | 6b |
| Hub | 7 |
| Slotted aperture | 8 |
| Row cleaner assembly | 10 |
| Row cleaner frame | 11 |
| First side | 11a |
| First side tab | 11aa |
| Second side | 11b |
| Second side tab | 11bb |
| First side angled portion | 11c |
| Second side angled portion | 11d |
| Curved portion | 11e |
| Row cleaner wheel aperture | 11f |
| Row cleaner wheel | 12 |
| Tool arm row cleaner mount | 13 |
| Front plate portion | 13a |
| Row cleaner frame portion | 13b |
| Tool arm portion | 13c |
| Angled portion | 13d |
| Row cleaner frame mounting plate | 14 |
| Front plate member | 14a |
| Row cleaner frame member | 14b |
| Pivot | 16 |
| Nut | 17 |
| Bolt | 18 |
| Aperture | 19 |
| Washer | 21 |
| Depth adjustment | 22 |
| Depth adjustment dial | 23 |
| Interface rack | 24 |
| Wireless Control System | 1400, 1500, 1520, 1540, 1560, 1580 |
| Tractor | 1404 |
| Planter | 1402 |
| Programmable logic controller (PLC) | 1410, 1502 |
| Wireless/portable computing/communication device | 1406 |
| Wireless communication link | 1408 |
| Control valves | 1412, 1506 |
| Pneumatic/hydraulic cylinders/groups | 1414, 1504, 1522, 1524, 1542, 1562, 1582, 1584 |
| Air pressure sensor | 1416 |
| Pressure regulator | 1422 |
| Directional control valve | 1424 |
| CAN bus | 1526 |
| Signal converter box | 1426 |
| Control/feedback line | 1528, 1530, 1544, 1564, 1586, 1588 |

Before the present methods and apparatuses are disclosed and described, it is to be understood that the methods and apparatuses are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description. The terms "row cleaner assembly" 10 and "row cleaner" may be used interchangeably when referring to generalities of configuration and/or corresponding components, aspects, features, functionality, methods and/or materials of construction, etc. thereof, whether separately employed or incorporated into a planter row unit 1, unless explicitly stated otherwise. "Row cleaner assembly 10" and "row cleaner" as used herein are not limited to any specific aspect, feature, and/or configuration thereof, and may include any row cleaner having one or more inventive feature disclosed herein unless so indicated in the following claims.

Before the various aspects of the present disclosure are explained in detail, it is to be understood that the disclosure is not limited in its application to the details of construction and the arrangements of components set forth in the following description or illustrated in the drawings. The present disclosure is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description, and do not alone indicate or imply that the device or element referred to must have a particular orientation. In addition, terms such as "first", "second", and "third" are used herein and in the appended claims for purposes of description and are not intended to indicate or imply relative importance or significance.

DETAILED DESCRIPTION OF INVENTION

Figure 2:
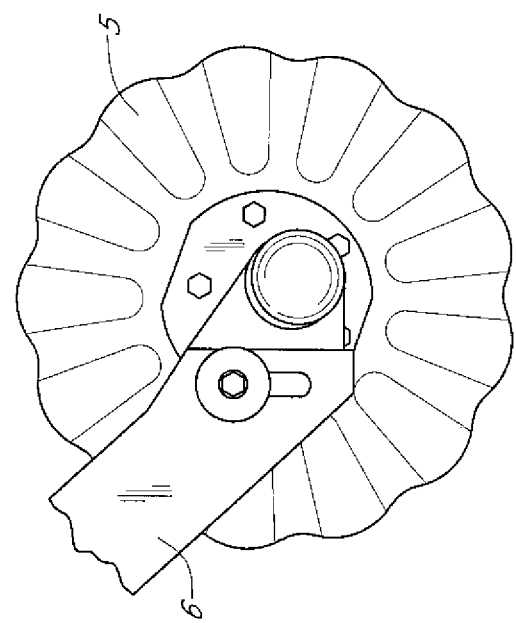
FIG. 2 provides a side view of a coulter and tool arm as found in the prior art.
Figure 3:
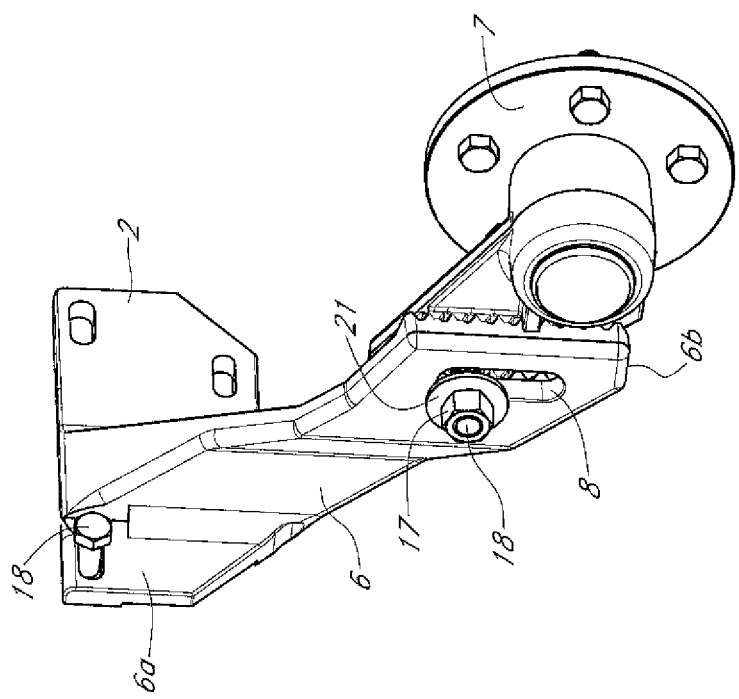
FIG. 3 provides a frontal perspective view of a tool arm mounted to a front plate as found in the prior art.
Figure 6:
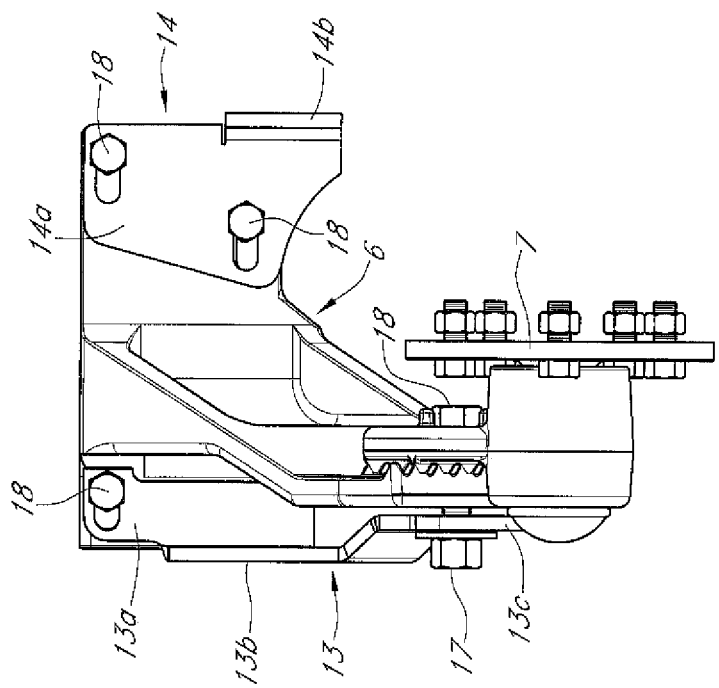
FIG. 6 provides a front view of FIG. 5.

Referring now to the drawings, wherein like reference numerals designate identical or corresponding parts throughout the several views, FIGS. 1, 2, and 3 illustrate the prior art. FIG. 1 is a planter row unit 1, as is well known in the art and upon which the present art floating row cleaner unit and components of wireless control system may be mounted. FIG. 2 is a side view of a prior art coulter 5 and tool arm 5 over which the row cleaner assembly 10 may be mounted. FIG. 3 illustrates a view of the coulter 5 and tool arm 6 as shown in FIG. 1 with the planter row unit 1 removed for clarity. As referred to hereinbelow, the planter row unit is attached to a planter 1402 with is operated conventionally as by a tractor 1404. The operator of the tractor 1404, as described in detail below, operates the wireless control system such as by way of a wireless-connected computing/communications device, e.g., smart phone, tablet, notebook, laptop, PDA, or other suitable device, to improve performance of the floating row cleaner attachment. As operators often have with them such computing/communications devices, the operator cabin of the tractor need not have any additional displays, control or other devices that take up space in the crowded area. The wireless control system components are located at the planter unit.

With respect to the row cleaning attachment as deployed in a conventional row planter unit 1, the coulter 5 illustrated in FIGS. 2 and 3 uses a tool arm 6 to attach the coulter 5 in a relatively fixed, but adjustable position at the front of the planter row unit 1. For farmers desiring a planter for narrow row spacing, less than thirty inches and preferably as narrow as fifteen inches, single-arm, row unit mounted coulters 5, such as those shown in the various figures herein, are preferable. Double arm mounted coulters (not shown herein) are well known in the prior art but are of limited application for planter row units 1 configured for narrow row spacing. Furthermore, although applicant has illustrated the present art using a coulter 5, the present art is not limited as such. Other working tools or accessories may be mounted in place of the coulter 5 to work in combination with the planter row unit 1, as is well known to those skilled in the art.

As illustrated in FIG. 3, the tool arm 6 is affixed to the front plate 2 of the planter row unit 1 at the tool arm first end 6a by three bolts 18 passing through corresponding apertures 19 formed in the tool arm first end 6a and in the front plate 2 in conjunction with three nuts 17 and washers 21. A rotatable hub 7 is typically mounted at the tool arm second end 6b, which is opposite the front plate 2. A working tool, such as a coulter 5, may be mounted to the hub 7 such that the working tool may rotate with respect to the tool arm 6 and planter row unit 1. The working tool in FIG. 3 has been removed to better illustrate the tool arm 6.

As shown herein, the configuration of the tool arm 6 illustrated in FIGS. 3-8 is a two-piece design, with the tool arm first end 6a forming one piece and the tool arm second end 6b forming the second piece. The vertical position of the tool arm second end 6b may be adjusted with respect to the tool arm first end 6a, and consequently with respect to the planter row unit 1. The tool arm first end 6a and tool arm second end 6b interface one another at an interface rack 24 adjacent a slotted aperture 8 fashioned in a distal portion of the tool arm first end 6a. A bolt 18 passing through the slotted aperture 8 and a corresponding aperture 19 in the tool arm second end 6b, washer 21, and nut 17 fixes the position of the tool arm first end 6a with respect to the tool arm second end. This type of vertical adjustment between the tool arm second end 6b and tool arm first end 6a is well known to those skilled in the art and will not be described in further detail herein for purposes of clarity. The tool arm 6 extends from the front plate 2 so that the coulter 5 engages the ground prior to the planter row unit 1 during operation, which is most clearly shown in FIGS. 7-8. Other tools may be mounted to the hub 7 on the tool arm second end 6b, such as spiked wheels, compactions wheels, or any other tool known to those skilled in the art.

Figure 4:
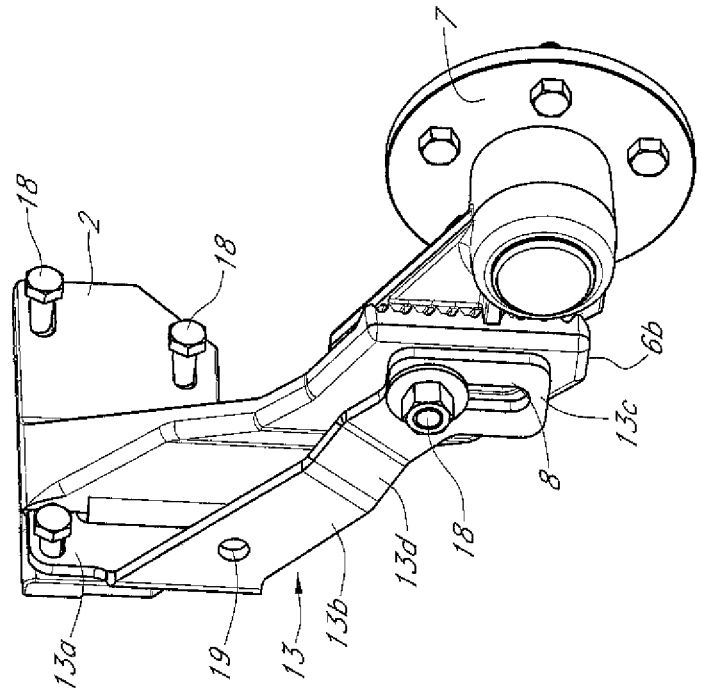
FIG. 4 provides a frontal perspective view of a tool arm with an exemplary embodiment of a tool arm row cleaner mount of the present art attached.

The exemplary embodiment of a tool arm row cleaner mount 13 (which is one component of the row cleaner mounting assembly) is shown affixed to the front plate 2 in FIG. 4. The tool arm row cleaner mount 13 of the exemplary embodiment is affixed to the front plate 2 via a nut 17, bolt 18, washer 21, and corresponding apertures 19 in the tool arm row cleaner mount 13 and the front plate 2. However, in other embodiments not pictured herein the tool arm row cleaner mount 13 is integrally formed with the front plate 2 or affixed to the front plate using other structures or methods than nuts 17, bolts 18, and washers 21. The nut 17 and bolt 18 used to mount the tool arm row cleaner mount 13 to the front plate 2 may simultaneously affix the tool arm 6 to the front plate 2, as is shown in FIG. 4.

The tool arm row cleaner mount 13 as shown in the exemplary embodiment includes a front plate portion 13a that is affixed to and abuts the front plate 2. A row cleaner frame portion 13b is integrally formed with the front plate portion 13a and oriented substantially perpendicularly thereto in the exemplary embodiment. The row cleaner frame portion 13b is adapted for pivotal engagement with a row cleaner frame 11, which engagement will be described in detail below. An angled portion 13d is integrally formed with the row cleaner frame portion 13b and angled with respect thereto. In the exemplary embodiment the angle between the row cleaner frame portion 13b and the angled portion 13d is approximately forty-five degrees, but may be greater or less in other embodiments not pictured herein. A tool arm portion 13c is integrally formed with the angled portion 13d and angled with respect thereto such that the tool arm portion 13c is substantially parallel to the row cleaner frame portion 13b in the exemplary embodiment of the tool arm row cleaner mount 13. The tool arm row cleaner mount 13 and various elements thereof may have different orientations/relationships depending on the planter row unit 1. In other embodiments, the tool arm row cleaner mount will only include a front plate portion 13a and row cleaner frame portion 13b.

Figure 5:
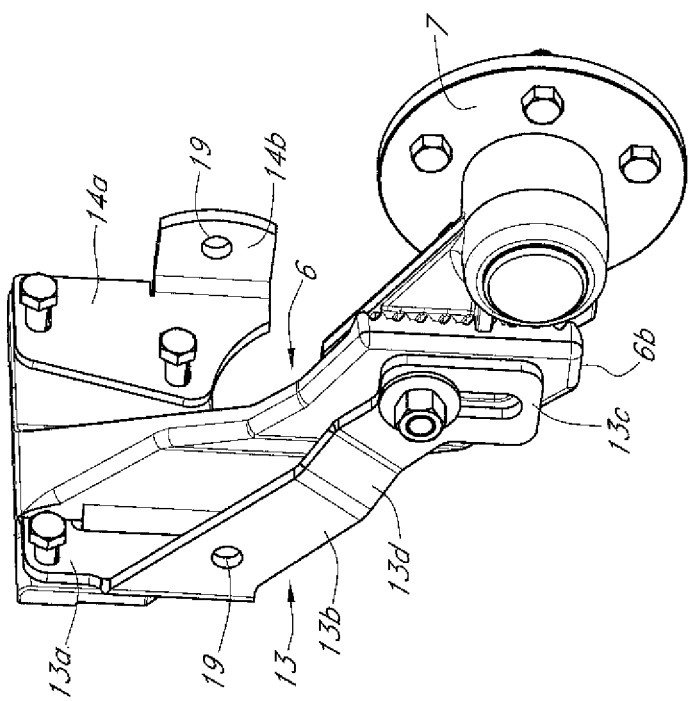
FIG. 5 provides a frontal perspective view of a tool arm with a tool arm row cleaner mount and row cleaner frame mounting plate of the present art attached.

As illustrated in FIG. 5, a row cleaner frame mounting plate 14 may be mounted to the front plate 2. The row cleaner frame mounting plate 14 of the exemplary embodiment is affixed to the front plate 2 via a plurality of nuts 17 and bolts 18 and corresponding apertures 19 in the tool arm row cleaner mount 13 and the front plate 2. However, as with the tool arm row cleaner mount 13, in other embodiments not pictured herein the row cleaner frame mounting plate 14 is integrally formed with the front plate 2 or affixed to the front plate using other structures or methods than nuts 17 and bolts 18. The nuts 17 and bolts 18 used to mount the row cleaner frame mounting plate 14 to the front plate 2 may simultaneously affix the tool arm 6 to the front plate 2, as is shown in FIG. 5.

The row cleaner frame mounting plate 14 as shown in the exemplary embodiment includes a front plate member 14a that is affixed to and abuts the front plate 2. A row cleaner frame member 14b is integrally formed with the front plate member 14a and oriented substantially perpendicularly thereto in the exemplary embodiment. The row cleaner frame member 14b is adapted for pivotal engagement with a row cleaner frame 11, which engagement will be described in detail below.

Figure 7:
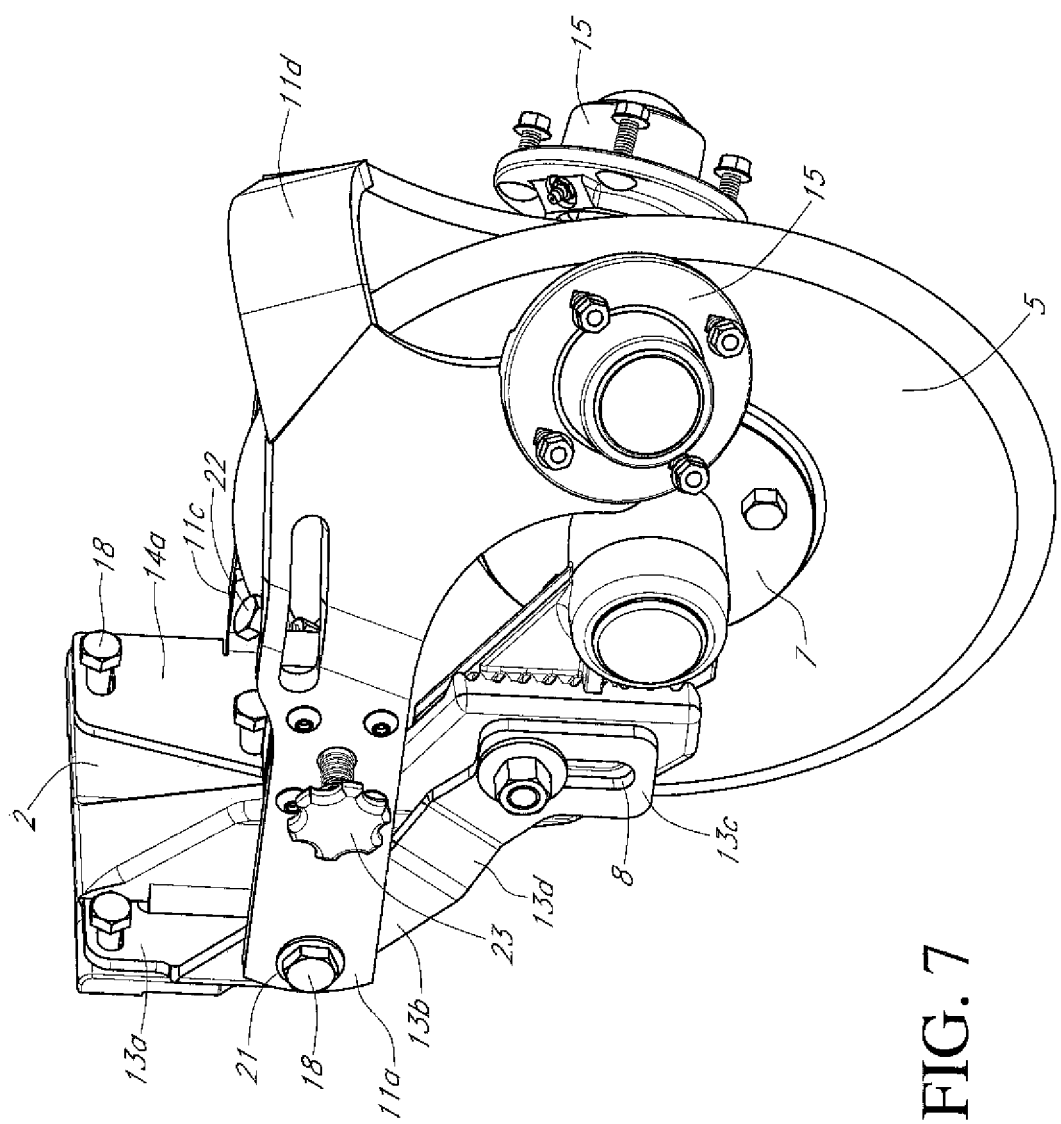
FIGS. 7 and 7A provide frontal perspective views of the apparatus shown in FIG. 5 with a row cleaner frame affixed thereto, and respectively with and without a coulter attached.
Figure 7A:
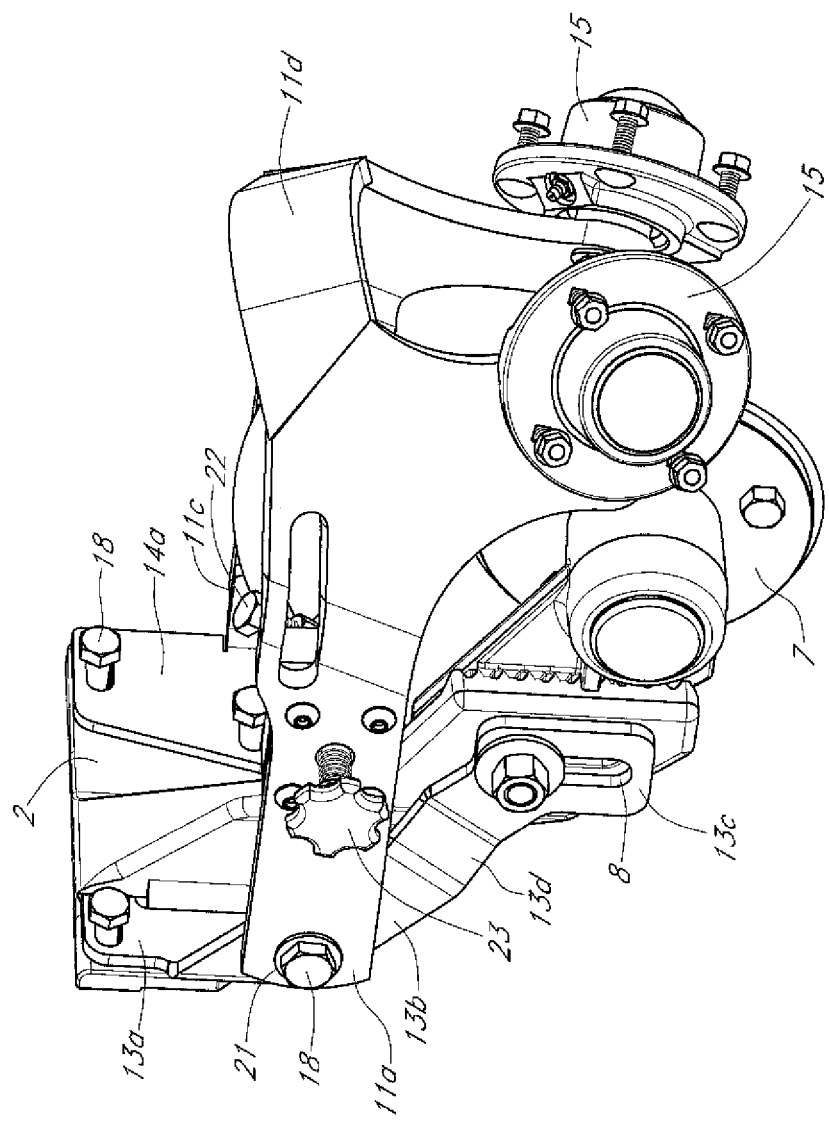

As shown in FIGS. 7 and 7A, a row cleaner frame, typically having either a generally U- or V-shape, may pivotally attach to the tool arm row cleaner mount 13 at the row cleaner frame portion and to the row cleaner frame mounting plate 14 at the row cleaner frame member 14b. In the exemplary embodiment, these pivotal attachments are achieved through an aperture 19 formed in the row cleaner frame portion 13b and another formed in the row cleaner frame member 14b that correspond to apertures 19 formed in the row cleaner frame 11. Nuts 17, bolts 18, and washers 21 are used to secure the row cleaner frame 11 to the tool arm row cleaner mount 13 and row cleaner frame mounting plate 14. However, in other embodiments not pictured herein, other structures and/or methods may be used to pivotally attach the row cleaner frame 11 to the tool arm row cleaner mount 13 and/or row cleaner frame mounting plate 14.

Figure 9:
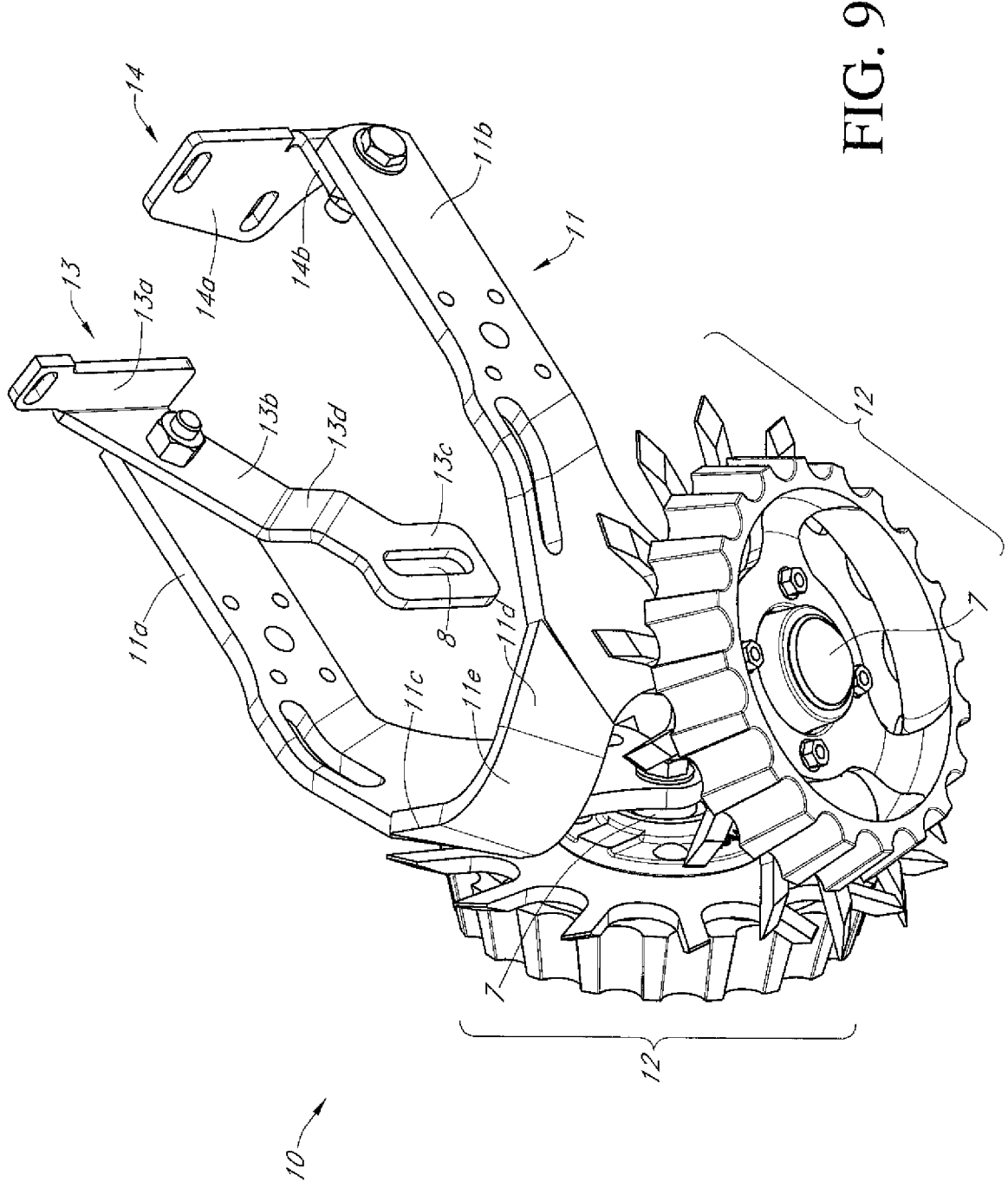
FIG. 9 provides a perspective view of the exemplary embodiment of a row cleaner assembly.
Figure 10:
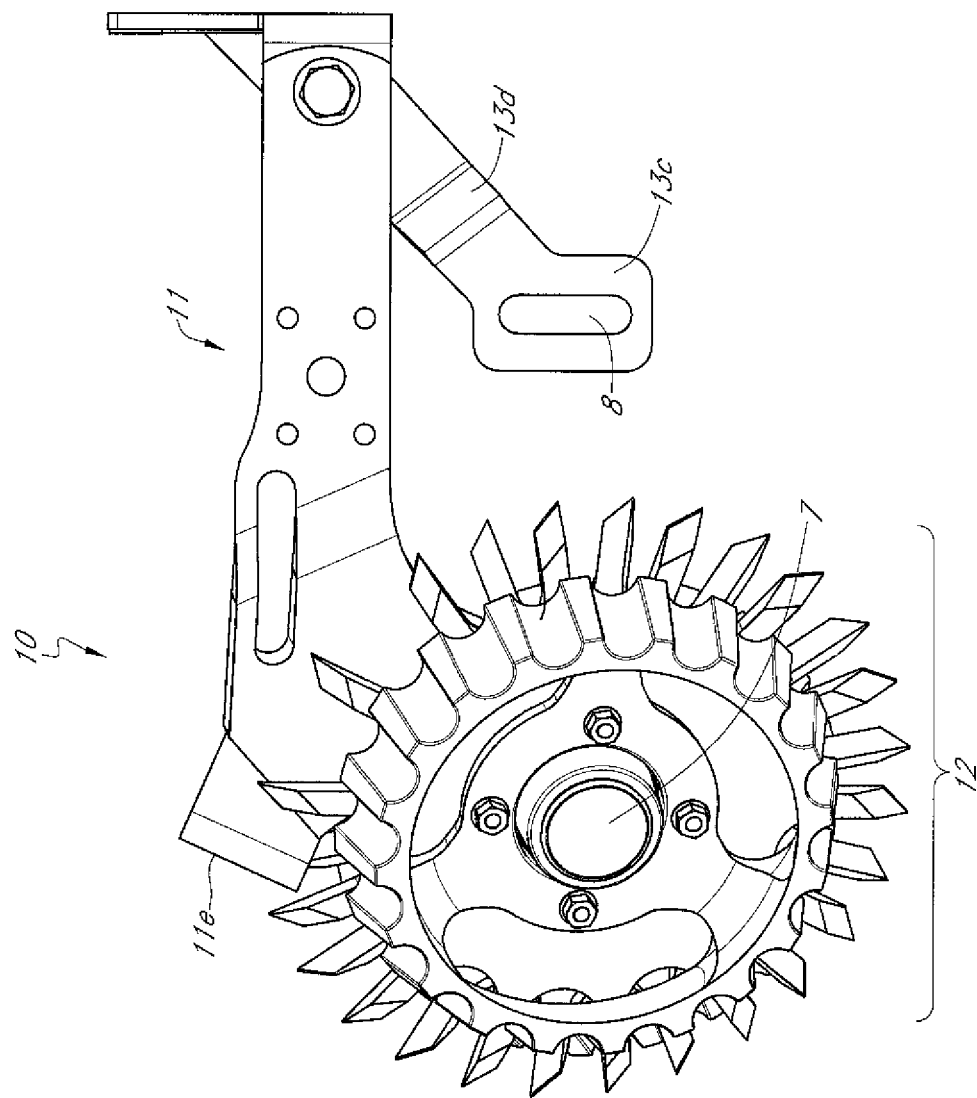
FIG. 10 provides a side view of the exemplary embodiment of a row cleaner assembly.
Figure 11:
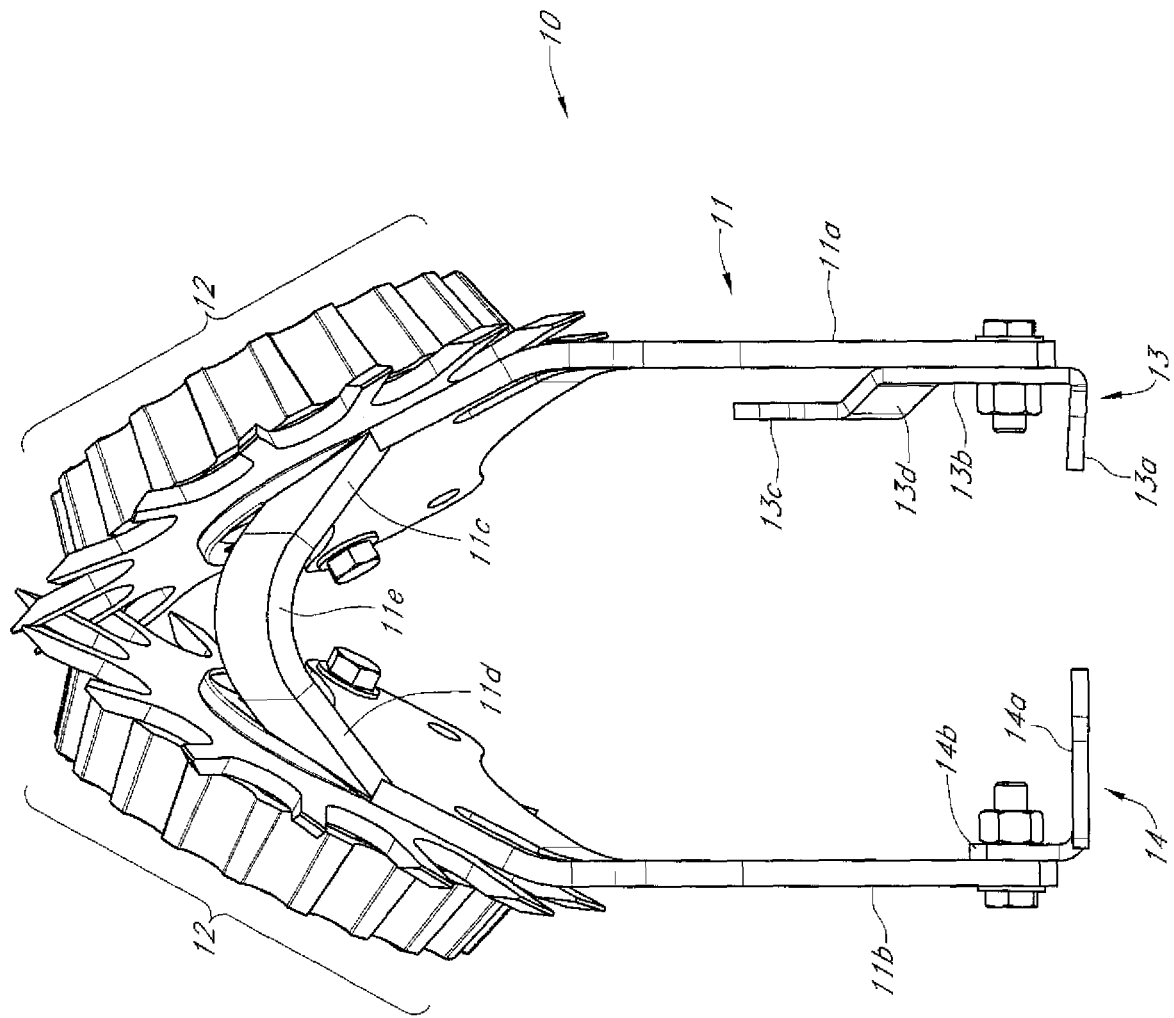
FIG. 11 provides a top view of the exemplary embodiment of a row cleaner assembly.

The row cleaner frame, which is shown in detail in FIGS. 9-11, is generally symmetrical with respect to a vertically oriented plane and extends from the front plate 2 in the same direction as the tool arm 6 (see FIG. 11). A first side 11a is pivotally attached to the tool arm row cleaner mount 13 and a second side 11b is pivotally attached to the row cleaner frame mounting plate 14. In the exemplary embodiment of the row cleaner assembly 10, the first and second sides 11a, 11b include sections that are substantially straight and sections that are angled, which are best shown in FIG. 11. The angle between the straight section and angled section of the first and second sides 11a, 11b will vary from one embodiment to the next, and in the exemplary embodiment is approximately twenty-five degrees. However, the precise angle in no way limits the scope of the row cleaner assembly 10.

Integrally formed with the first side 11a is a first side angled portion 11c, which is angled approximately twenty degrees with respect to the first side 11a. Integrally formed with the second side 11b is a second side angled portion 11d, which is angled approximately forty-five degrees with respect to the second side 11b. Affixed to and integrally formed with both the first and second side angled portions 11c, 11d is a curved portion 11e. In the exemplary embodiment, both the first and second sides 11a, 11b include hubs 7 pivotally mounted thereto to which row cleaner wheels 12 may be attached. The row cleaner frame 11 is configured such that it may be mounted over a coulter 5, wherein the coulter 5 and the row cleaner wheels 12 may simultaneously engage the ground surface (see FIGS. 7 and 8), and wherein the vertical position of the row cleaner frame 11 may change independently of the position of the tool arm 6.

The vertical position of the row cleaner frame 11 may be adjusted with respect to that of the tool arm 6 using an apparatus such as that described in U.S. Pat. No. 5,697,455 as well as in U.S. Pat. No. 9,642,298, both of which are incorporated by reference herein in their entirety. Accordingly, the row cleaner frame 11 in the exemplary embodiment is free to move away from the ground surface independently of the tool arm 6 until the row cleaner frame 11 or some element affixed thereto, such as a row cleaner wheel 12, meets an obstruction. The depth adjustment 22 provides a limit as to the amount of travel for the row cleaner frame 11 toward the ground surface, and thereby determines the vertical relationship between the row cleaner frame 11 and the coulter 5. The depth adjustment 22 may be manipulated by the user via the depth adjustment dial 23. Accordingly, the row cleaner frame 11 as shown in the exemplary embodiment provides a floating row cleaner, the advantages of which are well known to those skilled in the art.

As those practiced in the arts will appreciate, row cleaner wheels 12 are one structure for use in cleaning rows for agricultural purposes. Those of ordinary skill in the art will appreciate that the present art reduces residue plugging during operation and allows relatively narrow spacing between each of the two row cleaner wheels 12 mounted to a row cleaner frame 11 as well as allowing relatively narrow spacing between adjacent planter row units 1. As developed by the Applicant, the present art, when applied to a planter, allows for as little as fifteen-inch spacing between adjacent rows of seeds, which is useful and desired. A benefit of this configuration and operation is that less residue is uncovered or moved from the row area. As a result, trash flow is reduced thereby reducing planter row unit 1 plugging, which is beneficial and desirable.

As illustrated in the various figures show herein, the row cleaner wheels 12 may be angled with respect to the vertical axis. The vertical angle as shown in the exemplary embodiment is twenty-three degrees on each side, which results in a total of forty-six degrees between the row cleaner wheels 12. The row cleaner frame 11 may be configured to result in other combined vertical angle configurations of the row cleaner wheels 12 in the range of zero to ninety degrees.

In the exemplary embodiment as pictured herein, each row cleaner wheel 12 of a pair is symmetrical to the other row cleaner wheel 12 in that pair. In another embodiment not pictured herein, the row cleaner wheels 12 are still asymmetrical. As shown, each row cleaner wheel 12 is comprised of two non-equal diameter portions, which allows the user to control the amount of trash cleared by each row cleaner wheel 12 and simultaneously maintain depth control of each row cleaner wheel 12. That is, the smaller diameter portion restricts the depth of penetration of the larger diameter portion of each row cleaner wheel 12.

As one of ordinary skill will appreciate, the row cleaner assembly 10 may be configured for use and operation adjacent a plurality of row cleaner assemblies 10 and/or attached to a tool bar to form a contiguous planter unit (not shown). To modify the amount of trash cleared from each row, the row cleaner wheels 12 may be angled or positioned so that the periphery of adjacent row cleaner wheels 12 in a pair thereof intersect one another during use and operation for increased trash clearing. In another embodiment the row cleaner wheels 12 may be positioned so that the periphery of adjacent row cleaner wheels 12 do not intersect one another for less trash clearing.

Figure 12:
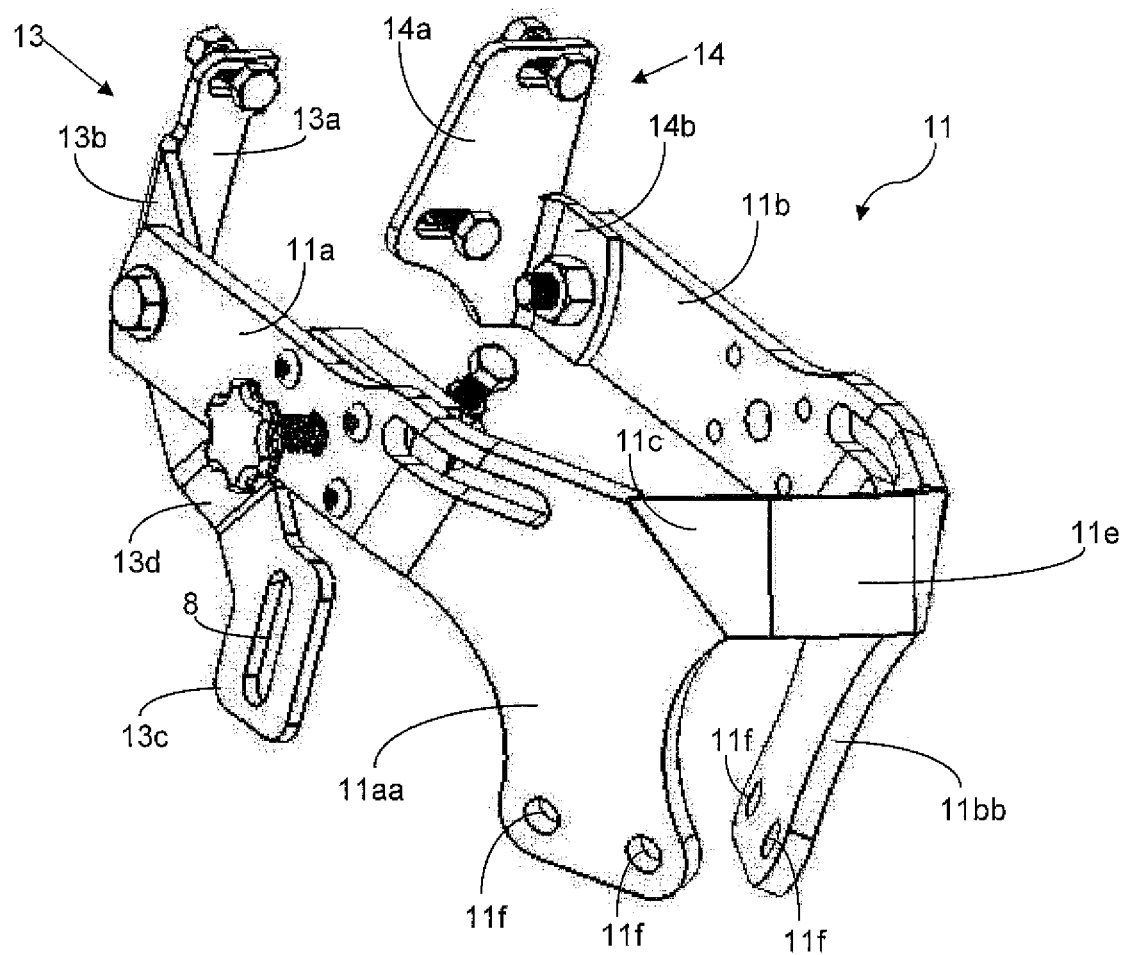
FIG. 12 provides a perspective view of one embodiment of the row cleaner frame with the coulter, row cleaner wheels, and various mounting structures removed for clarity.
Figure 13:
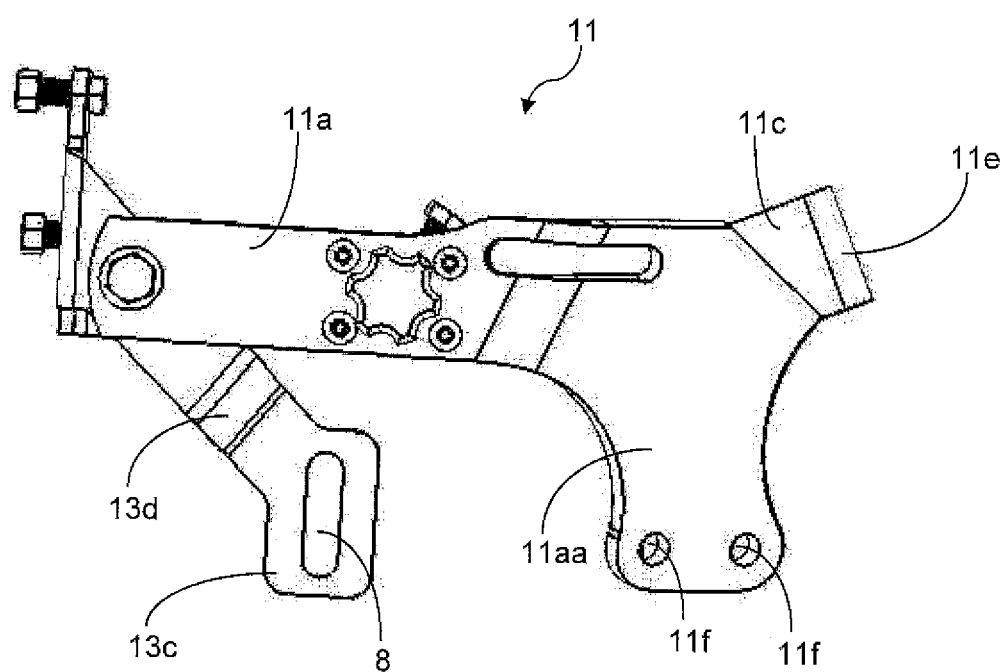
FIG. 13 provides a side view of one embodiment of the row cleaner frame with the coulter, row cleaner wheels, and various mounting structures removed for clarity.

As shown in FIGS. 12 and 13, the first side 11a may be formed with a first side tab 11aa, which extends below the first side 11a. The first side tab 11aa provides a lowered mounting point for the corresponding row cleaner wheel 12. The second side 11b may be formed with a similar second side tab 11bb. Either tab 11aa, 11bb may be formed with two row cleaner wheel apertures 11f. This allows the operator to position the row cleaner wheel 12 at two different positions on the row cleaner frame 11 so that the operator may select the optimal location based on specific conditions.

Figure 8:
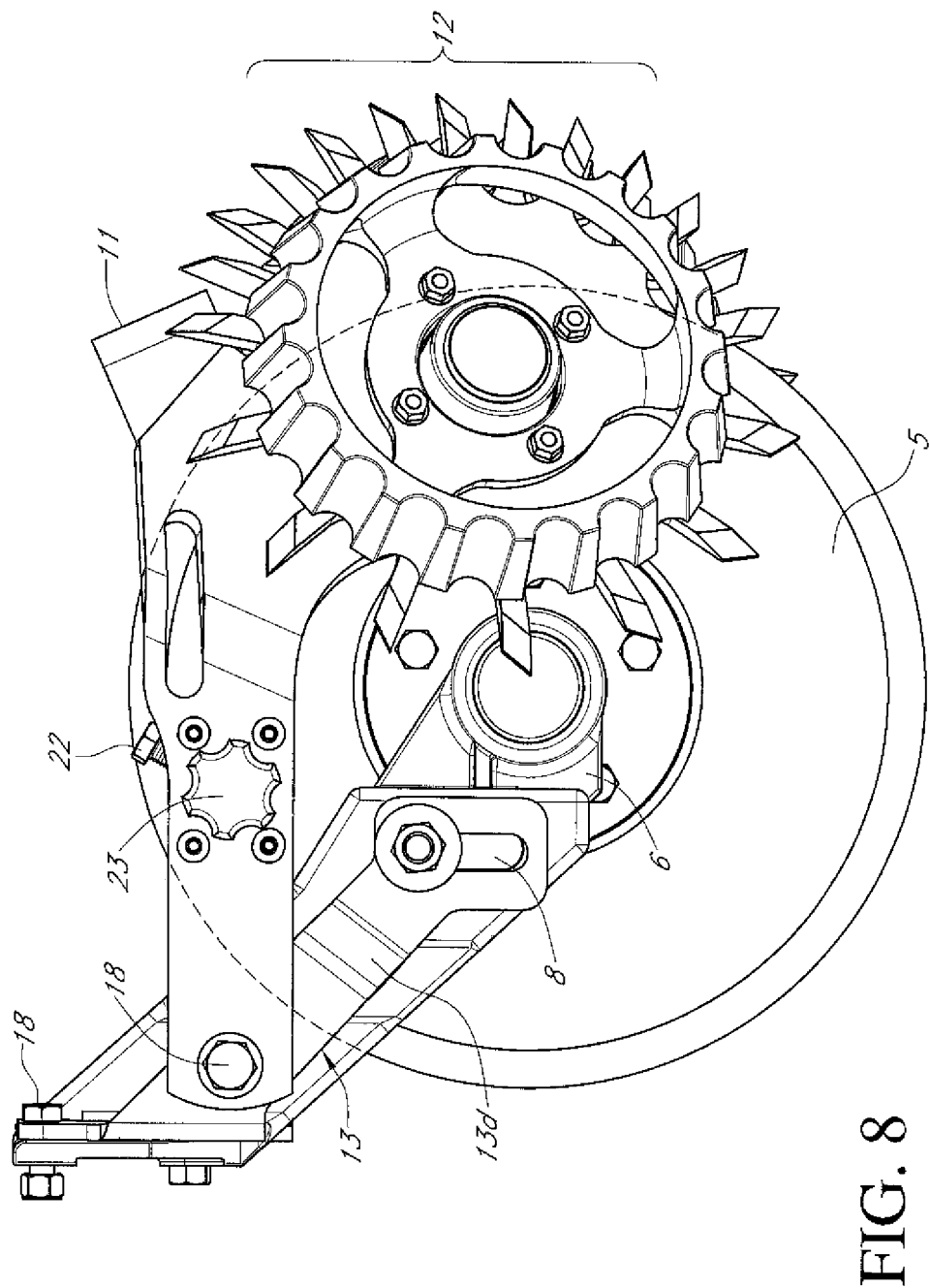
FIGS. 8 and 8A provide right side views illustrating one means of attaching applicant's row cleaner assembly to a front plate, and respectively with and without a coulter attached.
Figure 8A:
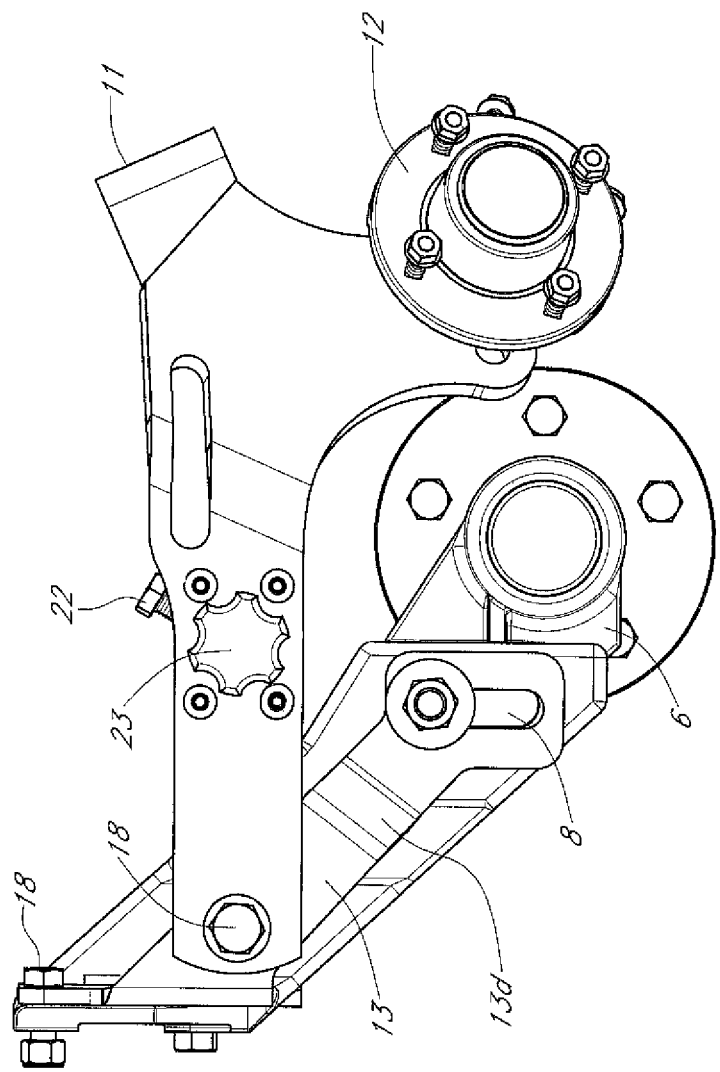

Providing a mounting point for the row cleaner wheel 12 that is below the first and second sides 11a, 11b of the row cleaner frame 11 allows the row cleaner assembly 10 to be more compact even when employed with additional structures, such as a coulter 5. Because the first and second side tabs 11aa, 11bb are lowered with respect to the other parts of the row cleaner frame 11, the row cleaner frame 11 may be placed in close proximity to an implement in the center of the row cleaner frame 11 while the row cleaner wheels 12 simultaneously are positioned in close proximity to the exterior sides of an implement in the center of the row cleaner frame 11. This situation is show in detail for a coulter 5 in FIG. 8, and without a coulter 5 in FIG. 8A. As shown, the tangential forward edge of the row cleaner assembly 10 (positioned toward the right in FIG. 8, and which is defined by the leading edge of the row cleaner wheels 12) is only marginally further forward than the tangential forward edge of the coulter 5. This compact dimension allows the row cleaner assembly 10 to be placed on a planter having multiple planter row units 1 even if the transport position for the planter requires that the row units be juxtaposed with one another about their respective length, such as the 1760 planter manufactured by Deere & Co.

As shown in FIG. 13, the axis of rotation for each row cleaner wheel 12 in the row cleaner assembly 10 is below the row cleaner frame 11. As explained in detail previously, this configuration allows the row cleaner frame 11 to be more compact in the horizontal dimension, even when used with an implement, such as a coulter 5.

Wireless Control System

As used herein, the term "downforce" may be interchangeable with the terms "downpressure" and/or "down pressure" without limitation unless so indicated in the following claims. Additionally, the term "hydraulic cylinder" may refer to any type of actuating device using pressurized fluid (e.g., air, petroleum-based liquids, etc.) including pneumatic cylinders without limitation unless so indicated in the following claims.

In certain applications, it may be desirable for an operator to have the ability to adjust the down pressure and/or downforce of one or more row cleaner assemblies 10 during operation. For example, U.S. Pat. No. 9,144,189, which is incorporated by reference herein in its entirety, discloses a downforce controller for adjusting the pressure of a hydraulic cylinder coupled to a row unit and a toolbar, which in turn adjusts the downforce of the row unit on the ground surface. However, such apparatuses require cumbersome and/or space-consuming controllers and/or control boxes to be mounted to a prime mover, such as a tractor, and oftentimes in the cab of a prime mover to ease access of an operator to the controller and/or control boxes.

Accordingly, in an aspect of the present invention, a wireless control system allows an operator to adjust the downforce of a row unit (and/or row cleaner assembly 10 without limitation unless so indicated in the following claims) via wireless communication, which may be accomplished via a portable computing device (including but not limited to a smartphone, tablet, laptop computer, PDA, and the like) without limitation unless so indicated in the following claims. A requirements specification for various aspects of such a wireless control system is attached hereto and made a part of this disclosure in its entirety as Appendix A, and a system proposal for same is attached hereto and made a part of this disclosure in its entirety as Appendix B.

Figure 14A:
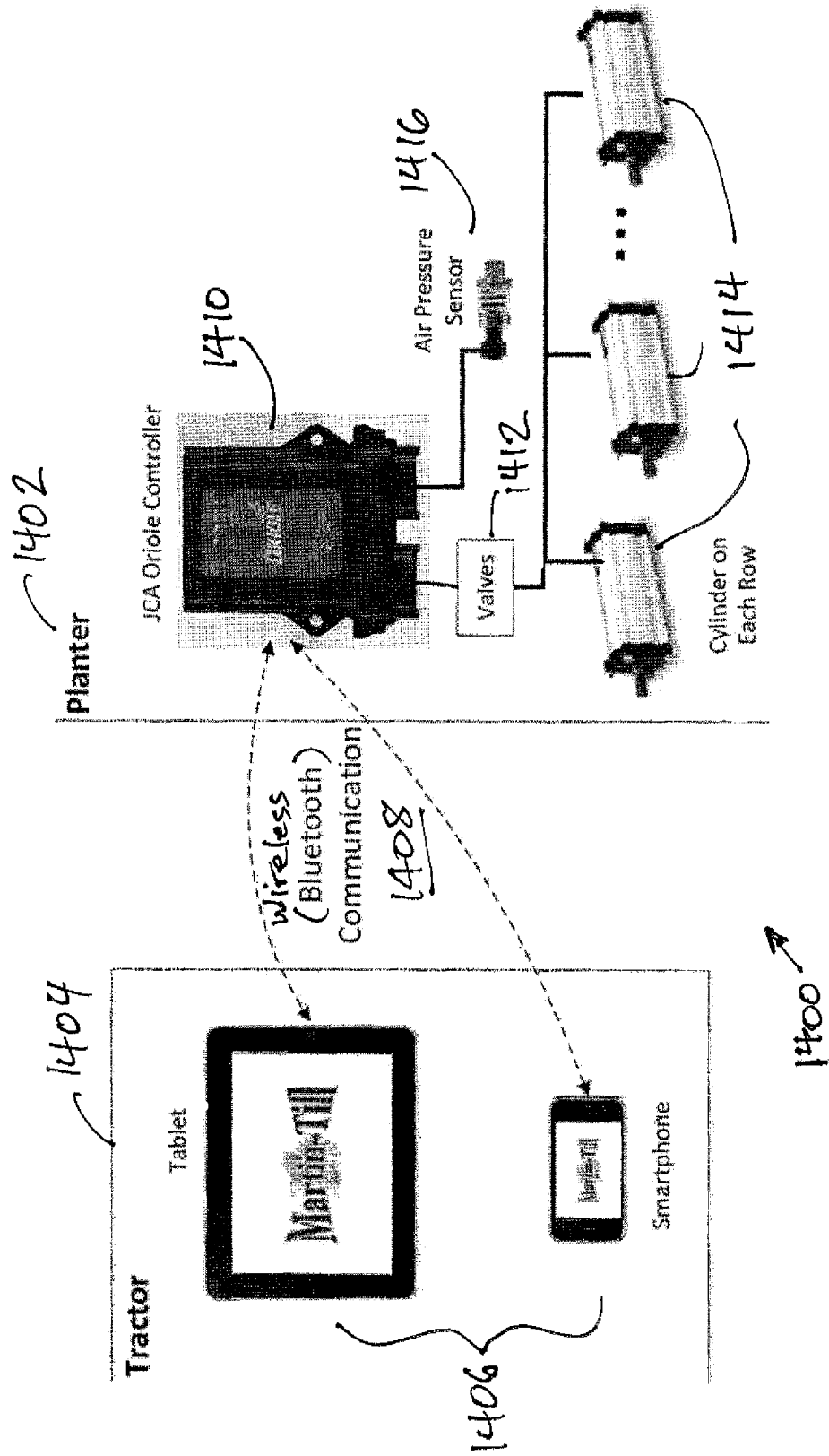
FIG. 14A provides a schematic view of one aspect of a wireless control system.
Figure 14B:
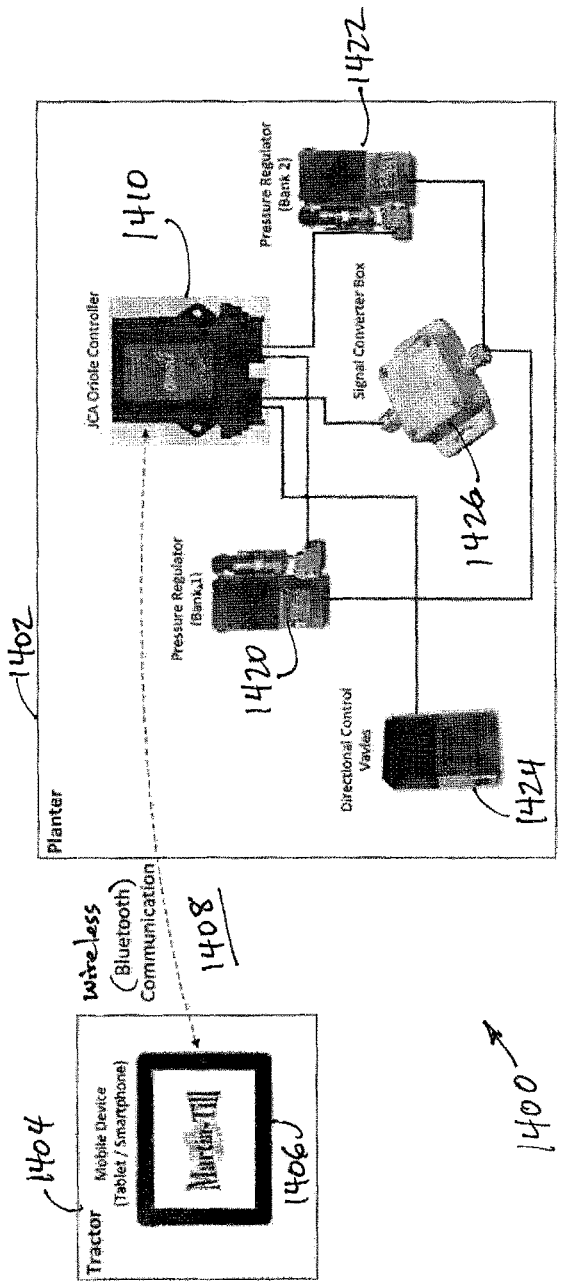
FIG. 14B provides a schematic view of additional components that may be used with the wireless control system show in FIG. 14A.

With reference to FIG. 14B, this system uses a single JCA Oriole controller as the implement controller that interfaces with two pressure regulators and directional control valves. A signal converter box is used to convert PWM signals from the Oriole controller to analog voltages in the range of 0-5V to set the target pressure for each of the pressure regulators. The pressure regulators each have integrated pressure sensors that feedback the actual measured pressure to the Oriole controller. Directional control valves are then used to extend or retract cylinders within the system, these valves are driven directly from the Oriole controller. The operator uses an app running on a tablet or smartphone to command the system pressure set points and directional control valves, and monitor the feedback for the actual pressure for each bank.

As disclosed in detail in Appendix B, in an aspect the wireless control system, various configurations and/or control schemes may be used without limitation unless so indicated in the following claims. For example, in one aspect the wireless control system may be configured to control one set of valves for a bank of hydraulic cylinders while maintaining the fluid pressure in the system in a specific window between a low and high value. In another aspect, the wireless control system may be configured to use the linear position of one or more hydraulic cylinders to ensure the desired amount of downforce is applied to a given row unit, wherein it is contemplated that such a configuration may provide more accuracy than a configuration controlling the fluid pressure of one or more cylinders. However, the optimal configuration may vary from one application to the next, and is therefore in no way limiting to the scope of the present disclosure unless so indicated in the following claims.

Referring now to FIG. 14A, which provides a schematic view of certain aspects of a first embodiment of the wireless control system, and FIG. 14B, which provides a schematic view of all but the pneumatic components of a wireless control system, in an aspect of a wireless control system configured to control the fluid pressure within one or more hydraulic cylinders. One or more microprocessors may be configured to drive one or more valves controlling one or more hydraulic cylinders. The hydraulic cylinders may be connected with one another via common hydraulic or pneumatic fluid conduit. The microprocessor may be programmable logic controller (PLC), e.g., a JCA Oriole Controller manufactured by JCA Industries Inc. of Winnipeg, Manitoba, Canada (http://www.jcaelectronics.ca/wp-content/uploads/2014/10/JCA_Oriole_Info_Sheet_Web.pdf) and in connection with a mid-level controller such as a JCA Falcon Controller (http://www.jcaelectronics.ca/products/falcon-mid-level-controller/), or any other suitable controller without limitation unless so indicated in the following claims.

FIG. 14A is a first exemplary embodiment of an air pressure control system 1400 having a relatively, when compared to the additional embodiments disclosed hereafter, lower accuracy for depth control of the row cleaner. In this system all cylinders 1414 on all rows are ganged or controlled together based on a common target air pressure level. In this embodiment, JCA controller 1410 controls cylinders 1414 via an output to pressure control valves 1412 and receives as an input a signal from air pressure sensor 1416. An operator, such as in tractor 1404, controls downforce control system via controller 1410 over communications link or network 1408 (e.g., Bluetooth, or other suitable communication link) through use of a handheld device 1406, such as a tablet or a smart phone.

The air pressure controlled system is the most straightforward of the two options, but would have less accuracy than the position feedback system. This system consists of a single JCA Oriole controller (see internal App. A for controller details), that drives valves controlling cylinders that are connected together on common air lines. An air pressure sensor is connected to the common line to measure the pressure in the system. A target pressure is set through an app on the tablet and/or smartphone, and communicated to the Oriole controller over Bluetooth. The controller will drive the valves to either increase or decrease the pressure to achieve the target pressure set by the system.

A fluid pressure sensor may be connected to a common hydraulic fluid conduit to measure the fluid pressure within the system. The fluid pressure sensor may be in communication with the controller, and the controller may be in communication with the portable computing device, which communication may be either wired or wireless (e.g., Bluetooth, various 802.11 protocols, etc.) without limitation unless so indicated in the following claims. Based on the data the fluid pressure sensor provides to the controller, the controller may cause one or more valves to open and/or close to maintain the desired system pressure. An operator may adjust/set the desired system pressure via a graphical user interface (GUI) that may be displayed on the portable computing device and communicated therefrom to the controller.

Figure 15A:
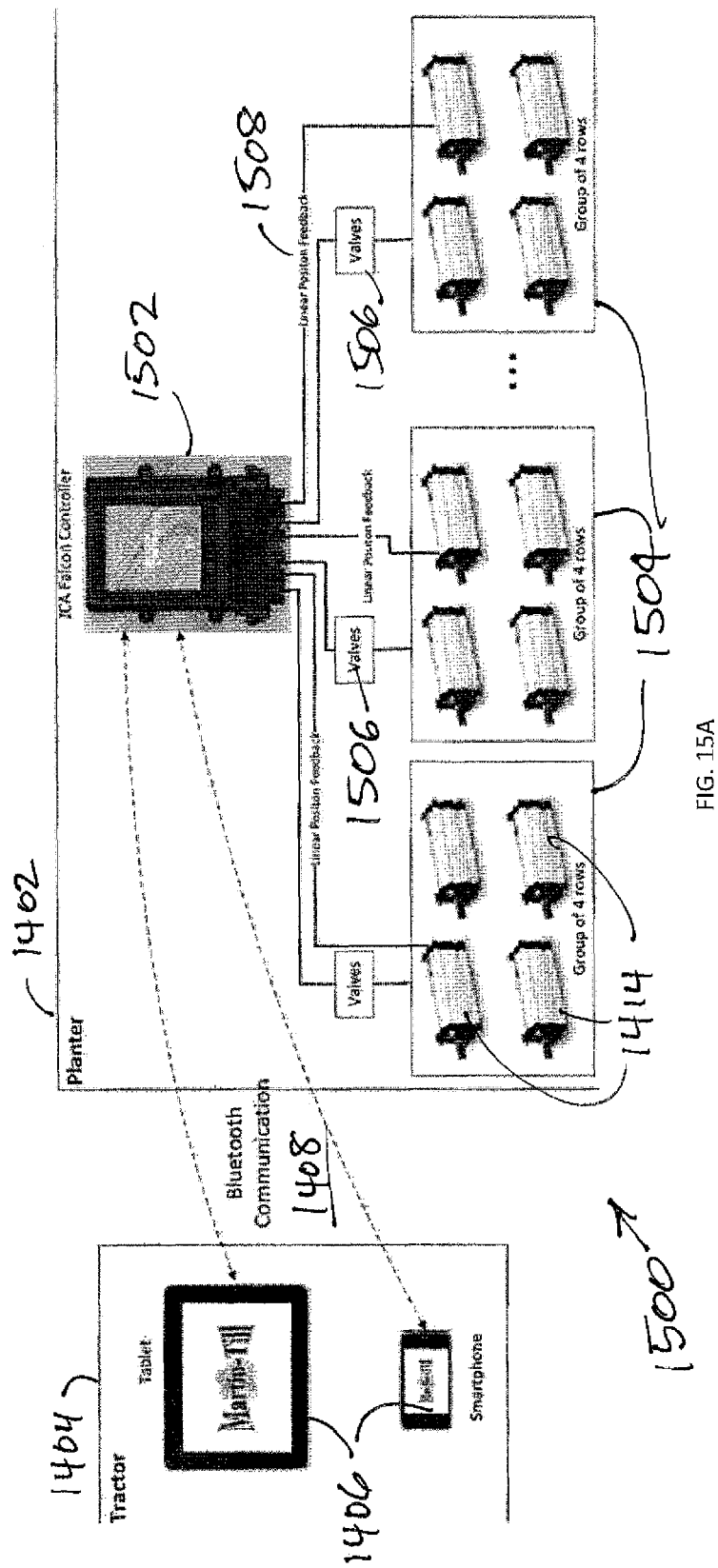
FIG. 15A provides a schematic view of other aspects of a wireless control system.

Referring now to FIG. 15A, which provides a schematic view of certain aspects of a wireless control system, in an aspect of a wireless control system configured to maintain a specific position of one or more hydraulic cylinders, a controller may be in communication with one or more valves. As with the wireless control system depicted in FIG. 14A, that depicted in FIG. 15A may employ any suitable controller without limitation unless so indicated in the following claims. For certain applications it is contemplated that a JCA Falcon Controller may be especially useful.

FIG. 15A is a second exemplary embodiment of an air pressure control system 1500 having a relatively, when compared to the above first embodiment, higher accuracy for depth control of the row cleaner. In this system groupings 1504 of cylinders 1414 are controlled separately as groups based on a common target air pressure level. In this embodiment, JCA controller 1410 controls cylinders 1414 via an output to zone pressure control valves 1506 and receives as inputs linear position feedback signals 1508. Again, an operator, such as in tractor 1404, controls downforce control system via controller 1502 over communications link or network 1408 (e.g., Bluetooth, or other suitable communication link) through use of a handheld device 1406, such as a tablet or a smart phone. In this case controller 1502 is, for example, the JCA Falcon Controller type. In this embodiment, the system 1500 groups cylinders 1414 into groups of four cylinders with each group or set controlled together by a single set of valves with linear position feedback used to regulate the system.

The system of FIG. 15A uses position feedback built into the pneumatic cylinder to maintain a target specified by the user through the smartphone/tablet app. In this option, groups of 4 cylinders (4 rows) are controlled with a single set of valves, and only the position feedback of one of the cylinders is used to measure the current position. It is assumed that the other cylinders are following the measured cylinder. In this system, a Falcon controller (see internal App. B for controller details) is used which has sufficient inputs and outputs to control up to 6 sections, each containing 4 rows (or a 24 row system). If more rows are required, a second Falcon controller could be used. The user can choose to set different target depths for each of the 4 row sections, or can chose to group each of the sections together to set a common depth. The user then can select the desired depth of each section, and configurations can be stored, named with custom names, and loaded at a later time to automatically return to preset depths.

Each valve may control fluid pressure to one or more hydraulic cylinders. In an aspect shown in FIG. 15A, each valve may control the fluid pressure to a group of four hydraulic cylinders, but the scope of the present disclosure is not so limited unless so indicated in the following claims. In an aspect, the position feedback of one hydraulic cylinder within a group may be provided to the controller to provide a representative position for each hydraulic cylinder within the group. As with the wireless control system depicted in FIG. 14A, the controller may be in communication with the portable computing device, which communication may be either wired or wireless (e.g., Bluetooth, various 802.11 protocols, etc.) without limitation unless so indicated in the following claims. Based on the data the position sensor of a hydraulic cylinder provides to the controller, the controller may cause one or more valves to open and/or close to maintain the desired hydraulic cylinder position. An operator may adjust/set the desired hydraulic cylinder position via a graphical user interface (GUI) that may be displayed on the portable computing device and communicated therefrom to the controller.

Figure 15B:
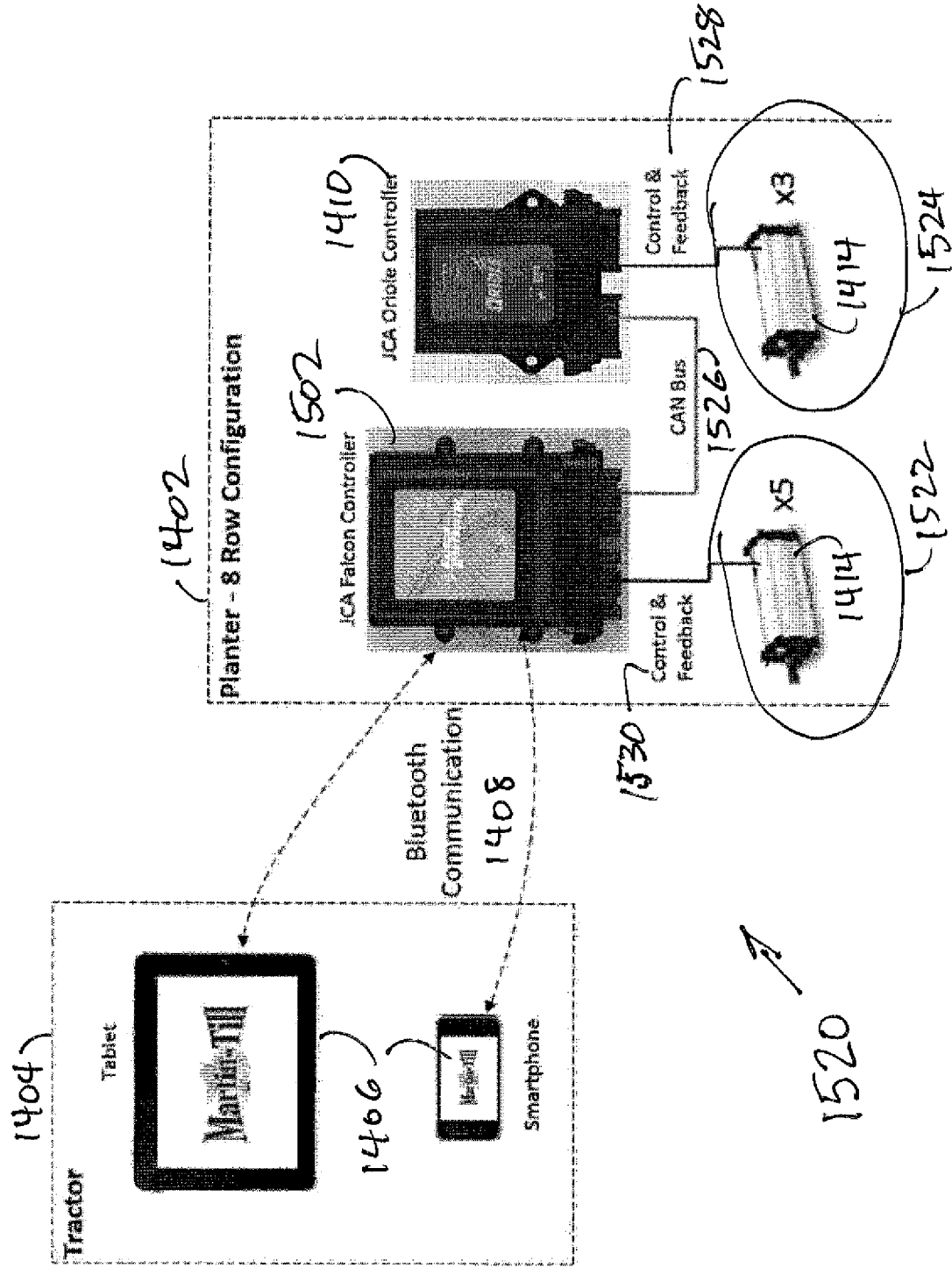
FIG. 15B provides a schematic view of other aspects of a wireless control system that may be adapted to allow individual adjustment of each hydraulic cylinder.
Figure 15C:
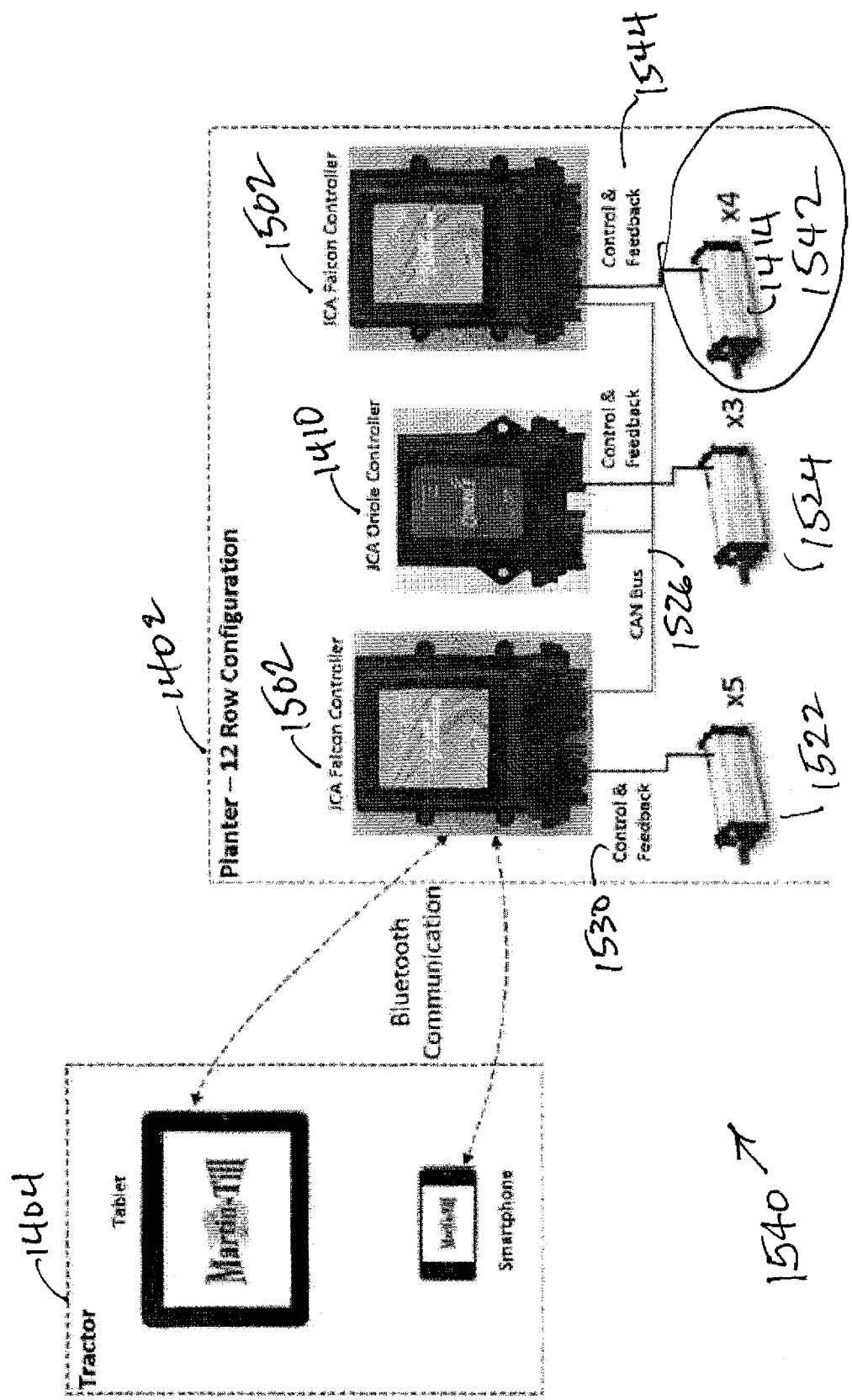
FIG. 15C provides a schematic view of other aspects of a wireless control system that may be adapted to allow individual adjustment of each hydraulic cylinder.
Figure 15D:
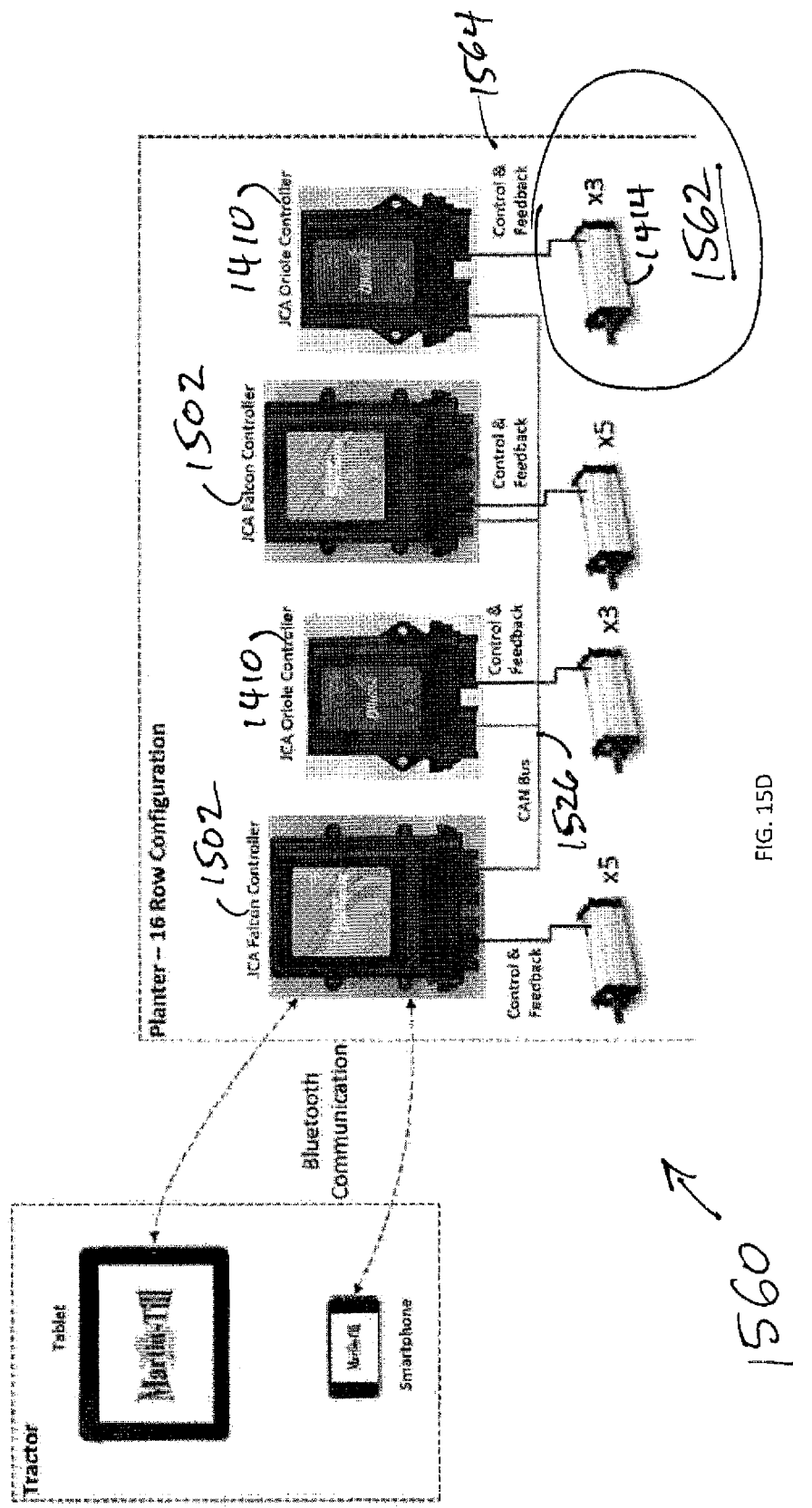
FIG. 15D provides a schematic view of further aspects of a wireless control system that may be adapted to allow individual adjustment of each hydraulic cylinder.
Figure 15E:
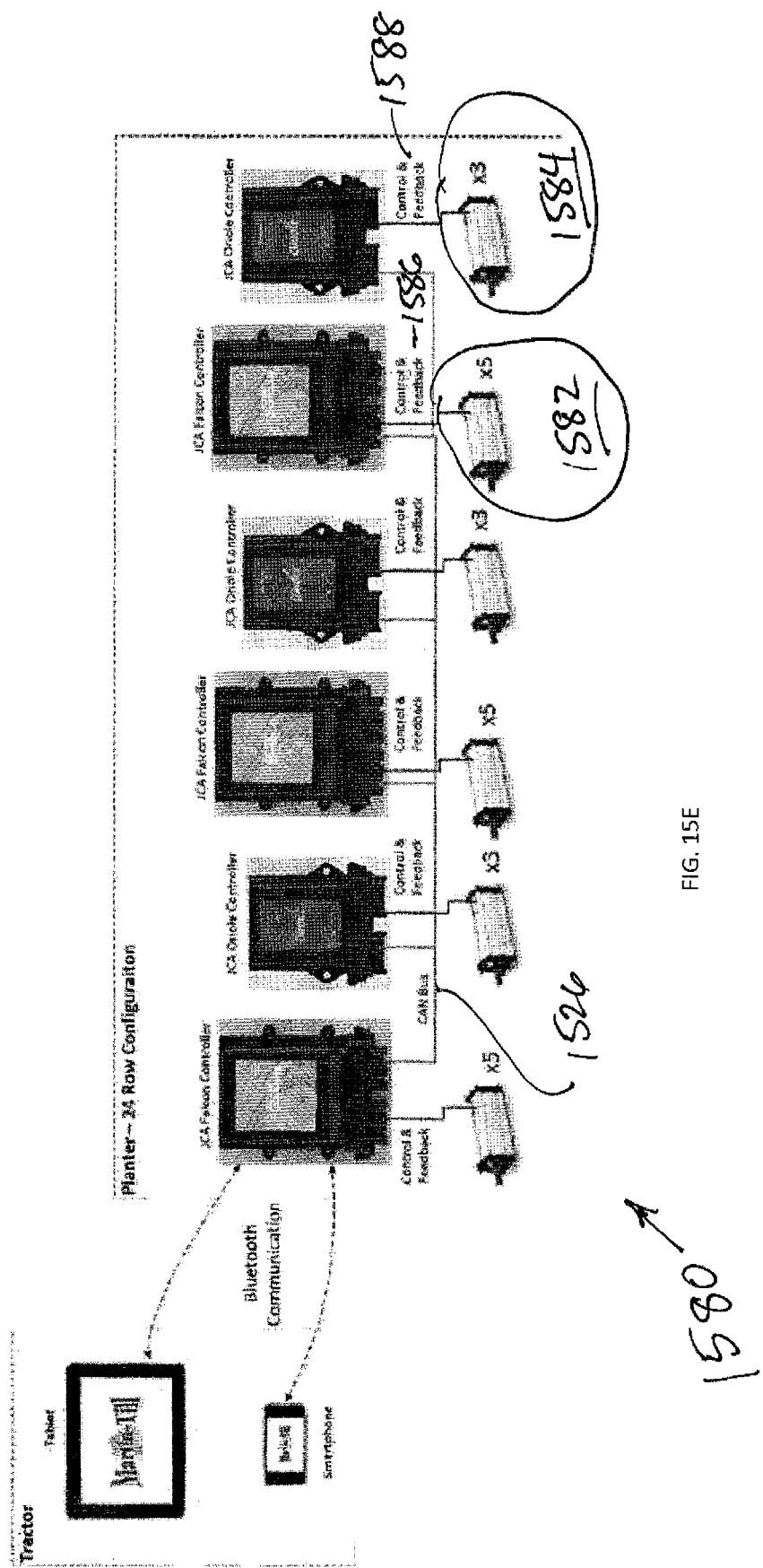
FIG. 15E provides a schematic view of further aspects of a wireless control system that may be adapted to allow individual adjustment of each hydraulic cylinder.

In an aspect, the wireless control system may be configured such that an operator may set a desired position for each individual hydraulic cylinder on a given implement. Various aspects of such a wireless control system adapted for use with an eight-row planter is shown in FIG. 15B. Various aspects of such a wireless control system adapted for use with a twelve-row planter is shown in FIG. 15C, with a sixteen-row planter is shown in FIG. 15D, and with a twenty-four-row planter is shown in FIG. 15E. However, the scope of the present disclosure is in no way limited by the number of hydraulic cylinders and/or rows of a row planter for which a wireless control system is configured unless so indicated in the following claims.

It is contemplated that wireless control systems configured to adjust the position of individual hydraulic cylinders may require additional control valves and/or additional controllers. Accordingly, as shown in FIGS. 15B-15E, a master controller may be configured to control one or more slave controllers. In an aspect, the master controller may be in communication with the portable computing device, and the slave controller(s) may be in communication with the master controller and/or with other slave controllers. In an aspect, it is contemplated that the communication between controllers (master-to-slave communication or slave-to-slave communication) may be through the CAN bus. However, other communication conduits may be used (either wired or wireless) without limitation unless so indicated in the following claims.

FIG. 15B is a third exemplary embodiment of an air pressure control system 1520 having a relatively, when compared to the embodiments disclosed above, higher accuracy for depth control of the row cleaner in an eight row configuration. In this system, as with that of FIG. 15A cylinders are placed and controlled in groups. Here, groupings 1522 and 1524 of cylinders 1414 are controlled separately as groups. In this embodiment, a master JCA Falcon controller 1502 is connected via a CAN bus 1526 to JCA controller 1410 and collectively control cylinder groups 1522 and 1524 via outputs to zone pressure control valves and are connected to cylinder groups via control and feedback signals 1528 and 1530. Again, an operator, such as in tractor 1404, controls downforce control system via controller 1502 over communications link or network 1408 (e.g., Bluetooth, or other suitable communication link) through use of a handheld device 1406, such as a tablet or a smart phone.

This system is similar to that of FIG. 15A in that linear position feedback is used to determine the depth of the row, but this option has independent control of each individual row. This option would have the highest accuracy and flexibility, but would require a larger number of controllers and valves (depending on the number of rows in the system). In this case each row could have its own depth target, or they can be grouped together with the same target (groups can be any different combination of rows), but the depth target for each row will be maintained based on the position feedback of that row. In this configuration, one Falcon controller is a master in a system with potentially multiple slave controllers that are connected to each other over the CAN bus. The master controller communicates to the tablet/smartphone app over Bluetooth, and then commands each of the slave controllers in the system. Each Falcon controller would be used to control 5 rows, and each Oriole controller would be used to control 3 rows.

FIG. 15C is a fourth exemplary embodiment of an air pressure control system 1560 for providing depth control of the row cleaner in a twelve row configuration. In this system, as with that of FIG. 15B groupings 1522 and 1524 of cylinders 1414 are controlled separately as groups by a master JCA Falcon controller 1502 connected via a CAN bus 1526 to JCA controller 1410. In this embodiment, an additional JCA Falcon controller 1502 is used to control additional cylinder group 1542 and includes control and feedback signal 1544 in a manner similar to that described above in connection with FIG. 15B.

FIG. 15D is a fifth exemplary embodiment of an air pressure control system 1560 for providing depth control of the row cleaner in a sixteen row configuration. In this system, as with that of FIG. 15C, groupings 1522,1524 and 1542 of cylinders 1414 are controlled separately as groups by a master JCA Falcon controller 1502 connected via a CAN bus 1526 to JCA controller 1410 and an additional JCA Falcon controller 1502. In this embodiment, an additional JCA Oriole controller 1410 is used to control additional cylinder group 1562 and includes control and feedback signal 1564 in a manner similar to that described above in connection with FIGS. 15B and 15C.

FIG. 15E is a sixth exemplary embodiment of an air pressure control system 1580 for providing depth control of the row cleaner in a twenty-four row configuration. In this system, as with that of FIG. 15D, groupings 1522,1524, 1542 and 1562 of cylinders 1414 are controlled separately as groups by a master JCA Falcon controller 1502 connected via a CAN bus 1526 to JCA controller 1410 and an additional JCA Falcon controller 1502 and an additional JCA Oriole controller 1410. In this embodiment, an additional JCA Oriole controller 1410 and an additional JCA Falcon controller 1502 are used to control additional cylinder groups 1582 and 1584 and includes control and feedback signal 1588 in a manner similar to that described above in connection with FIGS. 15B-D.

Tablet/Smartphone Application/Operating system

An application "app" may be developed as the user interface to the systems described above. The app can be developed for Android, Apple, and/or Microsoft platforms. It would be developed for one specific platform initially, and once testing is completed it would then be ported over to other platforms that need to be supported. The app would be available to users through app stores typically used for apps (Apple app store, Google Play store, etc.).

The basic app functionality that would be implemented for each option is as follows. In the alternative of the first embodiment the app would have a main operating screen that show the current system pressure measured, as well as a target pressure for the system. The operator could have the option to increase or decrease the target pressure, and also could have several stored settings of pressures used for different planting conditions. The stored settings could be named by the user and recalled at any time.

In the second alternative, the app would have a main operating screen and a setup screen. The main operating screen would show the current measured depth for each row section as well as a target depth that could be adjusted by the user. Similar to Option #1, the user could have predefined settings of depths that could be uniquely named and recalled automatically at later times. The setup screen would be used to define the number of sections that are controlled for the current system. Each section is a bank of 4 rows.

This app would have a main operating screen and a setup screen. The main operating screen would show the current measured depth for each individual row as well as a target depth for groups of row that could be adjusted by the user. Groups are user defined, and can be any number of rows that make sense to group together for control. Similar to the previous options, the user could have pre-defined settings of depths that could be uniquely named and recalled automatically at later times. The setup screen would be used to define the number of rows that are controlled for the current system, and how these are grouped for control.

It is contemplated that in another aspect of the wireless control system, an operator may be able to dynamically control the down pressure (and/or cause a portion of the wireless control system to dynamically control the down pressure) of one or more components of a row unit. Such a configuration may be especially useful if a single plot of land includes multiple conditions requiring different optimal down pressure values. Various aspects of a computer program and/or GUI that may be displayed on the portable computing device for use with the wireless control system are described in detail in Appendix B.

Additionally, although most illustrative embodiments pictured and described herein may be specifically adapted for use with row cleaner assemblies 10, the scope of the present disclosure is not so limited unless so indicated in the following claims. For example, it is contemplated that with another control valve, associated hydraulic cylinders, etc., a wireless control system may be adapted for use with the closing wheels of a row unit, and/or the furrow opening elements of a row unit (single disc, paired disc, etc.) without limitation unless so indicated in the following claims.

The materials used to construct the row cleaner assembly 10, row cleaner, wireless control system, and/or various elements and/or components thereof will vary depending on the specific application thereof, but it is contemplated that polymers, metals, metal alloys, natural materials, and/or combinations thereof may be especially useful for the row cleaner assembly 10, row cleaner, and/or various elements and/or components in some applications. Accordingly, the above-referenced elements may be constructed of any material known to those skilled in the art or later developed, which material is appropriate for the specific application of the present disclosure without departing from the spirit and scope of the present disclosure unless so indicated in the following claims.

Having described preferred aspects of the various methods and apparatuses, other features of the present disclosure will undoubtedly occur to those versed in the art, as will numerous modifications and alterations in the embodiments and/or aspects as illustrated herein, all of which may be achieved without departing from the spirit and scope of the present disclosure. Accordingly, the methods and embodiments pictured and described herein are for illustrative purposes only, and the scope of the present disclosure extends to all method and/or structures for providing the various benefits and/or features of the present disclosure unless so indicated in the following claims. Furthermore, the methods and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the row cleaner assembly 10, row cleaner, and/or various elements and/or components are not limited to the specific embodiments pictured and described herein, but are intended to apply to all similar apparatuses and methods for providing the various features, functionalities, and/or advantages of those components. Modifications and alterations from the described embodiments will occur to those skilled in the art without departure from the spirit and scope of the present disclosure.

Any of the various features, components, functionalities, advantages, aspects, configurations, etc. for the row cleaner assembly 10, row cleaner, and/or various elements and/or components may be used alone or in combination with one another depending on the compatibility of the features, components, functionalities, advantages, aspects, configurations, etc. Accordingly, an infinite number of variations of the present disclosure exist. Modifications and/or substitutions of one feature, component, functionality, aspect, configuration, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

While the row cleaner assembly 10, row cleaner, and/or various elements and/or components and methods of using same have been described in connection with preferred aspects and specific examples, it is not intended that the scope be limited to the particular embodiments and/or aspects set forth, as the embodiments and/or aspects herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

While the invention has been described by reference to certain preferred embodiments, it should be understood that numerous changes could be made within the spirit and scope of the inventive concept described. In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A wireless control system for use with a planter row unit to provide adjustable depth control of a set of row cleaner assemblies, the control system comprising:
   a. a programmable logic controller (PLC) adapted to communicate via a communications link with a user-operated processor-based device having operating thereon a control application compatible with the operating system of the PLC, the PLC further adapted to communicate via a CAN bus with associated control components;
   b. a plurality of fluid cylinders adapted to provide variable down force on respective row cleaner devices, each of the plurality of fluid cylinders being fixed at one end relative to a frame portion of a planter row unit; and
   c. a set of pressure control valves each adapted to receive an input and operate, based on the received input, the plurality of fluid cylinders.

2. The control system of claim 1, further comprising a second PLC unit which together with the first PLC unit form a master/slave configuration for controlling separate sets of fluid cylinders.

3. The control system of claim 1, wherein the plurality of fluid cylinders are hydraulic cylinders.

4. The control system of claim 1, wherein the plurality of fluid cylinders are pneumatic cylinders.

5. The control system of claim 1, further comprising a position feedback sensor adapted to sense the position of a fluid cylinder and produce a position feedback signal representative of the sensed position, the position feedback sensor having an output in direct or indirect communication with the PLC via the CAN bus for delivering the position feedback signal to the PLC.

6. The control system of claim 5, wherein the PLC causes one or more valves to open and/or close to maintain a desired fluid cylinder position.

7. The control system of claim 6, wherein the user-operated processor-based device is a portable controller device adapted to present a user interface element to enable an operator to adjust/set the desired fluid cylinder position via a graphical user interface (GUI) displayed on the portable controller device.

8. The control system of claim 1, wherein the PLC communicates with the user-operated processor-based device using a wireless protocol.

9. The control system of claim 8, wherein the wireless protocol is Bluetooth.

10. The control system of claim 1, wherein the user-operated processor-based device adapted to present a user interface element to enable an operator to dynamically control the down pressure of one or more components of a planter row unit to adapt for multiple terrain conditions requiring different optimal down pressure values.

* * * * *